United States Patent
Tsuji

(10) Patent No.: US 8,248,709 B2
(45) Date of Patent: Aug. 21, 2012

(54) ZOOM LENS BARREL THAT ATTAINS A HIGHER PHOTOGRAPHING MAGNIFICATION

(75) Inventor: Kanji Tsuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 12/849,619

(22) Filed: Aug. 3, 2010

(65) Prior Publication Data

US 2011/0032626 A1 Feb. 10, 2011

(30) Foreign Application Priority Data

Aug. 7, 2009 (JP) .................................. 2009-184906

(51) Int. Cl.
*G02B 15/14* (2006.01)
(52) U.S. Cl. ......................................................... 359/694
(58) Field of Classification Search .................. 359/699
See application file for complete search history.

(56) References Cited

U.S. PATENT DOCUMENTS

| | | | |
|---|---|---|---|
| 6,072,639 A * | 6/2000 | Onda | 359/694 |
| 7,046,456 B2 | 5/2006 | Tsuji | |
| 7,352,516 B2 | 4/2008 | Tsuji | |
| 2005/0128602 A1 | 6/2005 | Tsuji | |
| 2006/0181784 A1 | 8/2006 | Tsuji | |

FOREIGN PATENT DOCUMENTS

JP 2005-173412 6/2005

* cited by examiner

*Primary Examiner* — James Jones
(74) *Attorney, Agent, or Firm* — Cowan, Liebowitz & Latman, P.C.

(57) ABSTRACT

A zoom lens barrel capable of attaining a higher photographing magnification by reducing spacing between lens groups in a telephoto state. A first lens group barrel holds a first lens group. A second lens group holding member supported by a third cam barrel holds a second lens group. A spring member urges the holding member toward the first lens group. Cam followers are formed at an opposite end of the holding member from the first lens group. Cam grooves for engagement with the cam followers are formed on the third cam barrel. When the holding member is urged by the spring member in a non-shooting region, each cam groove is brought into contact via one cam surface with the associated cam follower. In a shooting region, the cam groove is brought into contact with the cam follower via two cam surfaces.

7 Claims, 23 Drawing Sheets

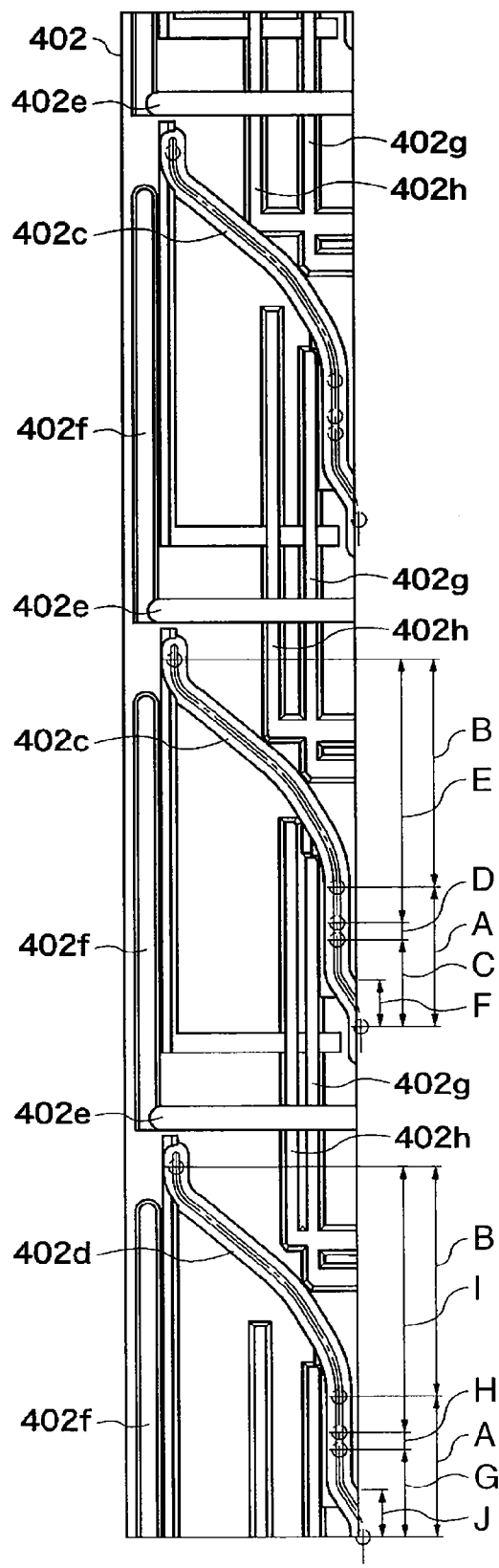

ZOOM LENS BARREL THAT ATTAINS A HIGHER PHOTOGRAPHING MAGNIFICATION

BACKGROUND OF THE INVENTION

1. Field of the Invention

The present invention relates to a zoom lens barrel having a plurality of stages of hollow cylindrical units that are extended in an optical axis direction.

2. Description of the Related Art

Conventionally, a lens barrel is configured such that in a wide-angle state, an object-side first lens group is largely extended in an optical axis direction to thereby increase spacing between the first lens group and a second lens group closer to an image-forming surface side than the first lens group is.

Further, the lens barrel is configured such that when zooming is performed from a wide-angle position to a telephoto position, the second lens group is largely extended from the wide-angle position toward an object to thereby reduce the spacing between the first lens group and the second lens group.

Furthermore, the lens barrel is configured such that in a non-shooting state, the first lens group and the second lens group are received (collapsed) into a camera body.

As a lens barrel of the above-mentioned type, there has been known one disclosed in Japanese Patent Laid-Open Publication No. 2005-173412. Parenthesized reference numerals and figure numbers used in the following description denote respective component parts and figures corresponding to those referred to in Japanese Patent Laid-Open Publication No. 2005-173412. The lens barrel disclosed in Japanese Patent Laid-Open Publication No. 2005-173412 includes a first cam member (10) formed with a first cam portion (10a) for driving a first holding member (7) in an optical axis direction and a second cam member (16) formed with a second cam portion (16a) for driving the first cam member in the optical axis direction.

The first holding member holds a first lens unit (1). The first and second cam portions are shaped such that during zooming operation in the whole range between a telephoto end and a wide angle end, the first holding member is driven from one end to the other such that it moves along a track convex toward one side in the optical axis direction.

Further, the lens barrel has a third cam member (17) formed with a third cam portion (17a) for driving a second holding member holding a second lens unit (2) in the optical axis direction.

The first holding member (7) holding the first lens unit (first lens group) (1) is largely extended from the collapsed position (FIG. 1) to the wide-angle position along a combination of respective tracks of a cam grove portion (22a) of a fixed barrel (22), the second cam portion (cam groove portion) (16a) of the second cam member (second cam barrel) (16), and the first cam portion (cam groove portion) (10a) of the first cam member (first cam barrel) (10). Further, the lens barrel is brought into a telephoto state (FIG. 3) where the spacing in the optical axis direction between the first lens group (1) and the second lens group (2) is reduced.

However, in the telephoto state (FIG. 3) where the spacing in the optical axis direction between the first lens group (1) and the second lens group (2) is reduced, the conventional technique disclosed in Japanese Patent Laid-Open Publication No. 2005-173412 suffers from the following problem.

To attain a higher photographing magnification, it is desirable to reduce the spacing between the first lens group and the second lens group in the telephoto state. However, a ring member (12), a guide member (11), and the first cam barrel (10) are located on the object side of a cam follower part (8a) of a second lens holder (8). This makes it impossible to further move the second lens holder (8) toward an object to reduce the spacing between the first lens group (1) and the second lens group (2).

SUMMARY OF THE INVENTION

The present invention provides a zoom lens barrel which is capable of attaining a higher photographing magnification by further reducing spacing between a first lens group and a second lens group in a telephoto state.

According to the present invention, there is provided zoom lens barrel including a plurality of stages of hollow cylindrical units that are extended in a direction of an optical axis of the zoom lens barrel, comprising a first hollow cylindrical unit configured to hold a first lens group, a second hollow cylindrical unit which is lower than the first hollow cylindrical unit by at least two stages, a holding member supported by the second hollow cylindrical unit and configured to hold a second lens group, and an urging unit configured to urge the holding member toward the first lens group, wherein a cam follower is formed on an opposite end of the holding member from the first lens group, and a cam portion for engagement with the cam follower is formed on the second hollow cylindrical unit, and wherein in a non-shooting region, the holding member is urged by the urging unit, whereby the cam portion is brought into contact with the cam follower via one cam surface thereof, whereas in a shooting region, the cam portion is in contact with the cam follower via two cam surfaces thereof, and wherein the cam follower in engagement with the cam portion moves in the optical axis direction in accordance with rotation of the second hollow cylindrical unit to thereby move the second lens group toward the first lens group.

According to the zoom lens barrel of the present invention, the cam follower is formed at the opposite end of the holding member from the first lens group. Further, when the holding member is urged by the urging unit in the non-shooting region, the cam follower is brought into contact with the one cam surface of the cam portion, whereby the position of the holding member in the optical axis direction is restricted. On the other hand, in the shooting region, the cam follower is held in contact with the two cam surfaces of the cam portion, whereby the position of the holding member in the optical axis direction is restricted.

According to the present invention, since the cam follower can be formed at the opposite end of the holding member from the first lens group, it is possible to increase the stroke of the second lens group toward an object side. Accordingly, it is possible to prevent interference between the cam follower and hollow cylindrical units disposed between the first hollow cylindrical unit and the second hollow cylindrical unit, when in the telephoto state. This makes it possible to further reduce spacing between the first lens group and the second lens group, and thereby achieve a higher photographing magnification. Further, since the cam portion is in contact via the one cam surface thereof with the cam follower in the non-shooting region, it is possible to reduce the length of the second hollow cylindrical unit in the optical axis direction.

In one embodiment of the zoom lens barrel, a cam portion for engagement with a movable cam follower formed to have a different shape of cross-section from other cam portions for engagement with respective other cam followers. This makes it possible to provide the movable cam follower and the other cam followers to thereby achieve stable zoom driving.

In another embodiment of the zoom lens barrel, the urging unit comprises a spring member configured to urge a second holding member holding a third lens group toward the first lens group, and a drive unit configured to drive the second holding member in the optical axis direction, and brings a protruding portion formed on the second holding member into contact with a receiving surface of the holding member. Therefore, it is possible to reliably bring the cam follower into contact with the one cam surface of the cam portion. This makes it possible to provide a non-shooting region by providing the cam portion with a single cam surface, which contributes to reduction of the length of the second hollow cylindrical unit in the optical axis direction.

In still another aspect of the zoom lens barrel, a position restricting unit configured to restrict the position of the holding member in the direction orthogonal to the optical axis in the non-shooting region is provided. Therefore, it is possible to reliably restrict the position of the holding member in the direction orthogonal to the optical axis direction.

Further features of the present invention will become apparent from the following description of exemplary embodiments with reference to the attached drawings.

BRIEF DESCRIPTION OF THE DRAWINGS

FIG. 9 is an unfolded view showing the inner peripheral surface of a third cam barrel.

DETAILED DESCRIPTION OF THE EMBODIMENTS

The present invention will now be described in detail below with reference to the accompanying drawings showing embodiments thereof. A zoom lens barrel 50 of the present invention has a plurality of stages of hollow cylindrical units configured to be extended in an optical axis direction, and is mounted to a digital camera.

Figure 1:
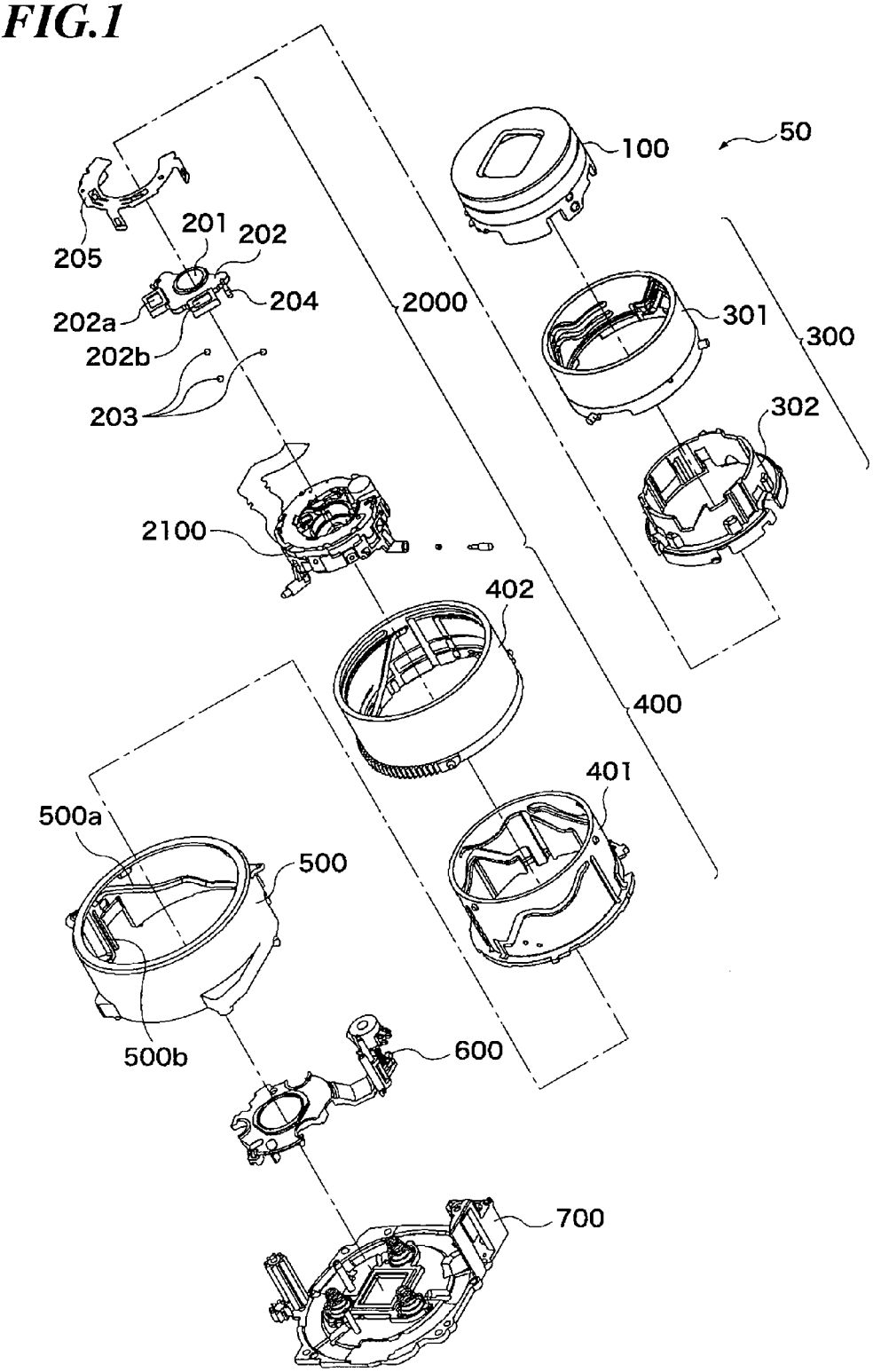
FIG. 1 is an exploded perspective view of a zoom lens barrel according to a first embodiment of the present invention.

FIG. 1 is an exploded perspective view of the zoom lens barrel 50 according to a first embodiment of the present invention. The zoom lens barrel 50 basically comprises a first group unit 100, a first movable cam unit 300, a second group unit 2000, a second movable cam unit 400, a fixed barrel 500, a third group unit 600, and a base unit 700. The second group unit 2000 includes an aperture shutter unit 2100.

Figure 2A:
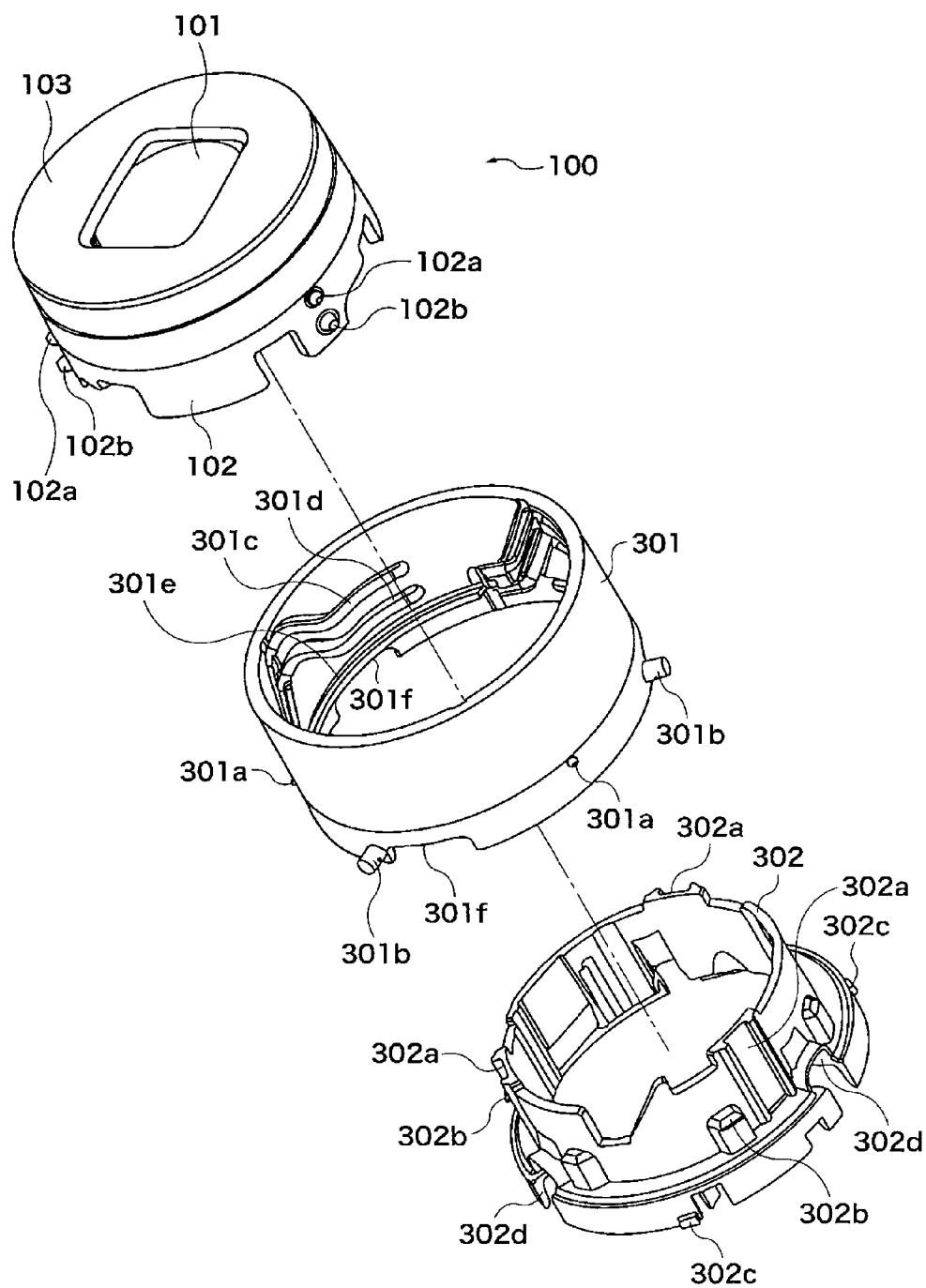
FIG. 2A is an exploded perspective view of a first group unit and a first movable cam unit.
Figure 2B:
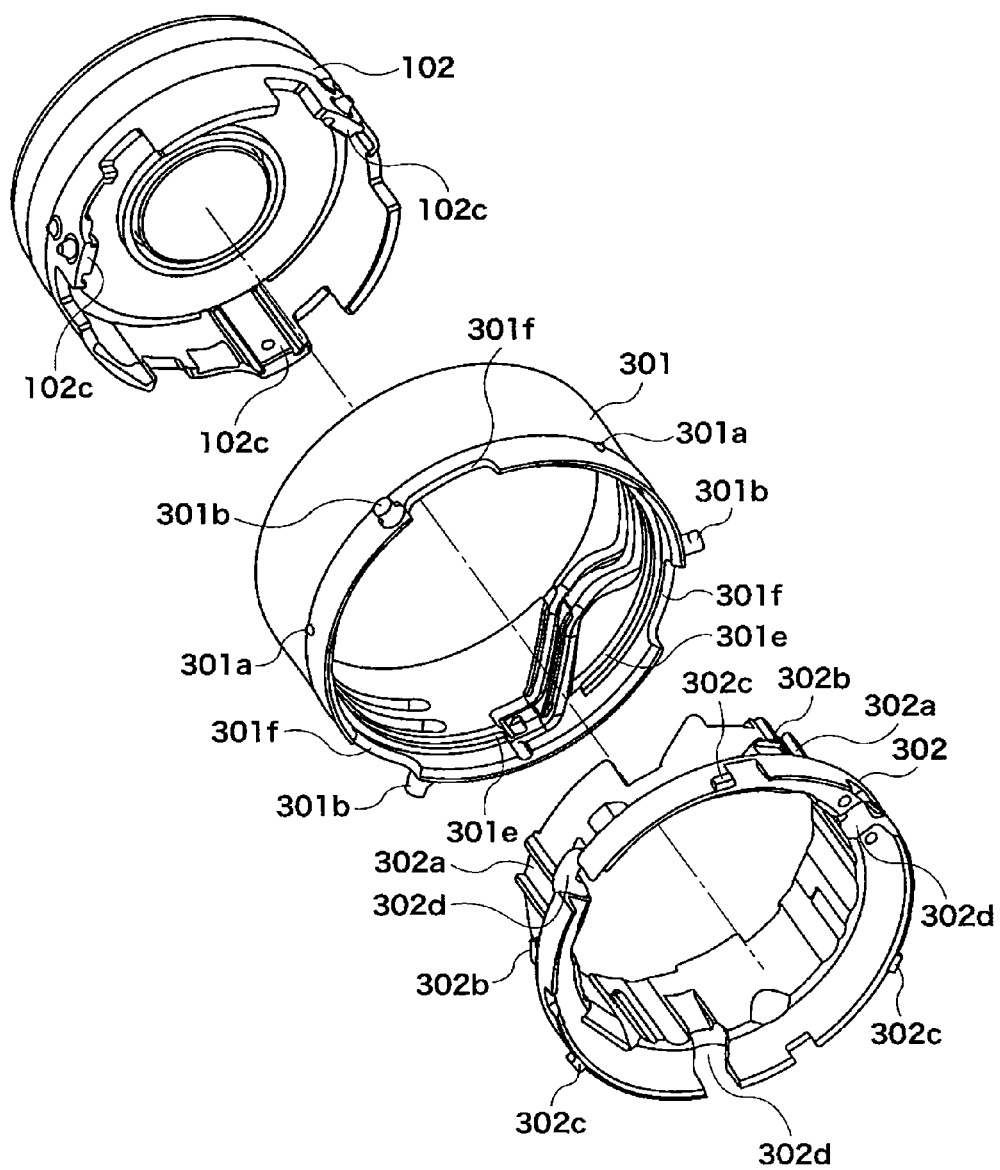
FIG. 2B is an exploded perspective view of the first group unit and the first movable cam unit, as viewed from a different direction from a view direction in FIG. 2A.

FIG. 2A is an exploded perspective view of the first group unit 100 and the first movable cam unit 300. The first movable cam unit is formed by a first cam barrel 301 and a rectilinear motion barrel 302. FIG. 2B is an exploded perspective view of the first group unit 100 and the first movable cam unit 300, as viewed from a different direction from a view direction in FIG. 2A.

The first group unit 100 comprises a first lens group 101, a first group barrel 102 (first hollow cylindrical unit) for holding the first lens group 101, and a cover member 103 attached to the first group barrel 102, for covering a lens front surface. On the outer peripheral surface of the first group barrel 102, there are formed three main cam followers 102a and three sub cam followers 102b at respective three circumferential locations. Further, on the inner peripheral surface of the first group barrel 102, there are formed three rectilinear motion-guiding protrusions 102c at respective three circumferential locations.

Figure 3:
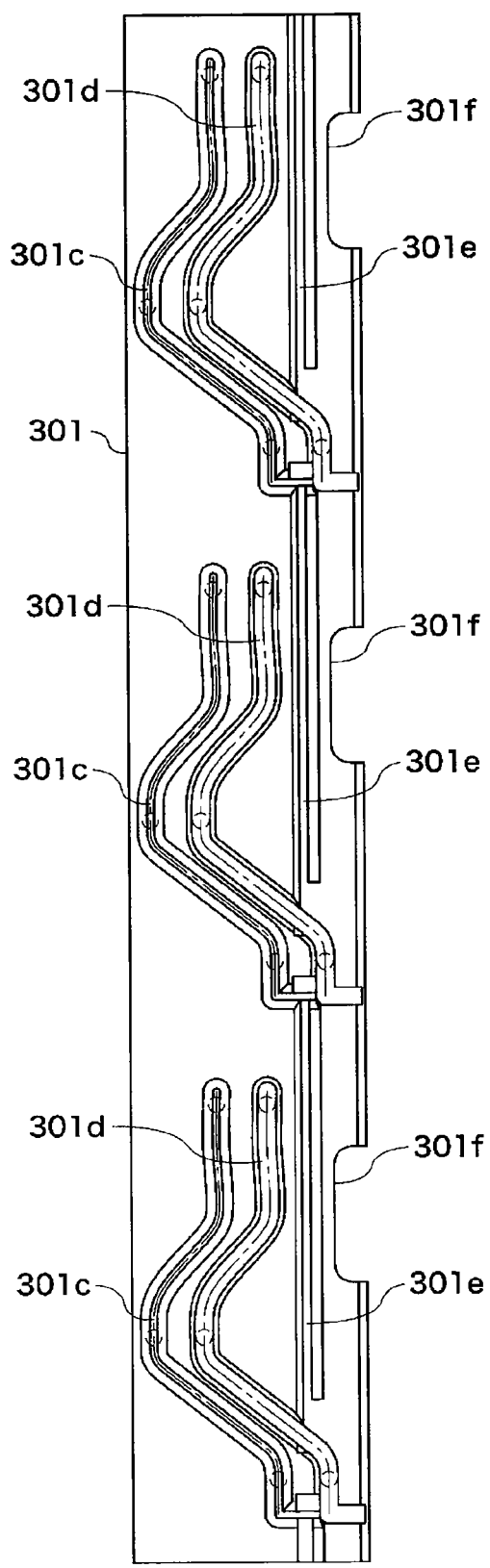
FIG. 3 is an unfolded view showing the inner peripheral surface of a first cam barrel.

FIG. 3 is an unfolded view showing the inner peripheral surface of the first cam barrel 301. On the outer peripheral surface of the first cam barrel 301, three cam followers 301a are formed at respective three circumferential locations, and three drive pins 301b are also formed at respective three circumferential locations (see FIG. 2B).

Further, in the inner peripheral surface of the first cam barrel 301, there are formed main cam grooves 301c and sub cam grooves 301d corresponding to the main cam followers 102a and the sub cam followers 102b of the first group barrel 102, respectively. The main cam grooves 301c and the sub cam grooves 301d define respective cam paths substantially parallel to each other.

The main cam followers 102a are in contact engagement with the respective associated main cam grooves 301c. The sub cam followers 102b and the sub cam grooves 301d are in a state spaced from each other.

Further, in the inner peripheral surface of the first cam barrel 301, there are formed three recesses 301e at respective three circumferential locations. Furthermore, at a rear end of the first cam barrel 301 as viewed in the optical axis direction from an image-forming side (on a side toward a CCD sensor 705, referred to hereinafter), there are formed three notches 301f at respective three circumferential locations avoiding the main cam grooves 301c and the sub cam grooves 301d. The rectilinear motion barrel 302 has rectilinear motion-guiding recesses 302a formed in an outer peripheral surface thereof at respective three circumferential locations, for engagement with the rectilinear motion-guiding protrusions 102c formed on the inner peripheral surface of the first group barrel 102 at the respective three circumferential locations (see FIG. 2A).

Further, on the outer peripheral surface of the rectilinear motion barrel 302, there are formed three protrusions 302b at respective three circumferential locations. The protrusions 302b are engaged with the recesses 301e of the first cam barrel 301, respectively, whereby the motion of each of the protrusions 302b in the optical axis direction is restricted, and the protrusion 302b and the associated recess 301e are rotatably connected to each other.

Furthermore, on the outer peripheral surface of the rectilinear motion barrel 302, there are formed rectilinear slide keys 302c at respective three circumferential locations. At a rear end of the rectilinear motion barrel 302 as viewed in the optical axis direction from the image-forming surface side, there are formed three notches 302d at respective three circumferential locations such that the first cam barrel 301 is permitted to rotate by a predetermined rotational angle. The notches 302d overlap the notches 301f of the first cam barrel 301 respectively in position in the optical axis direction.

Figure 4A:
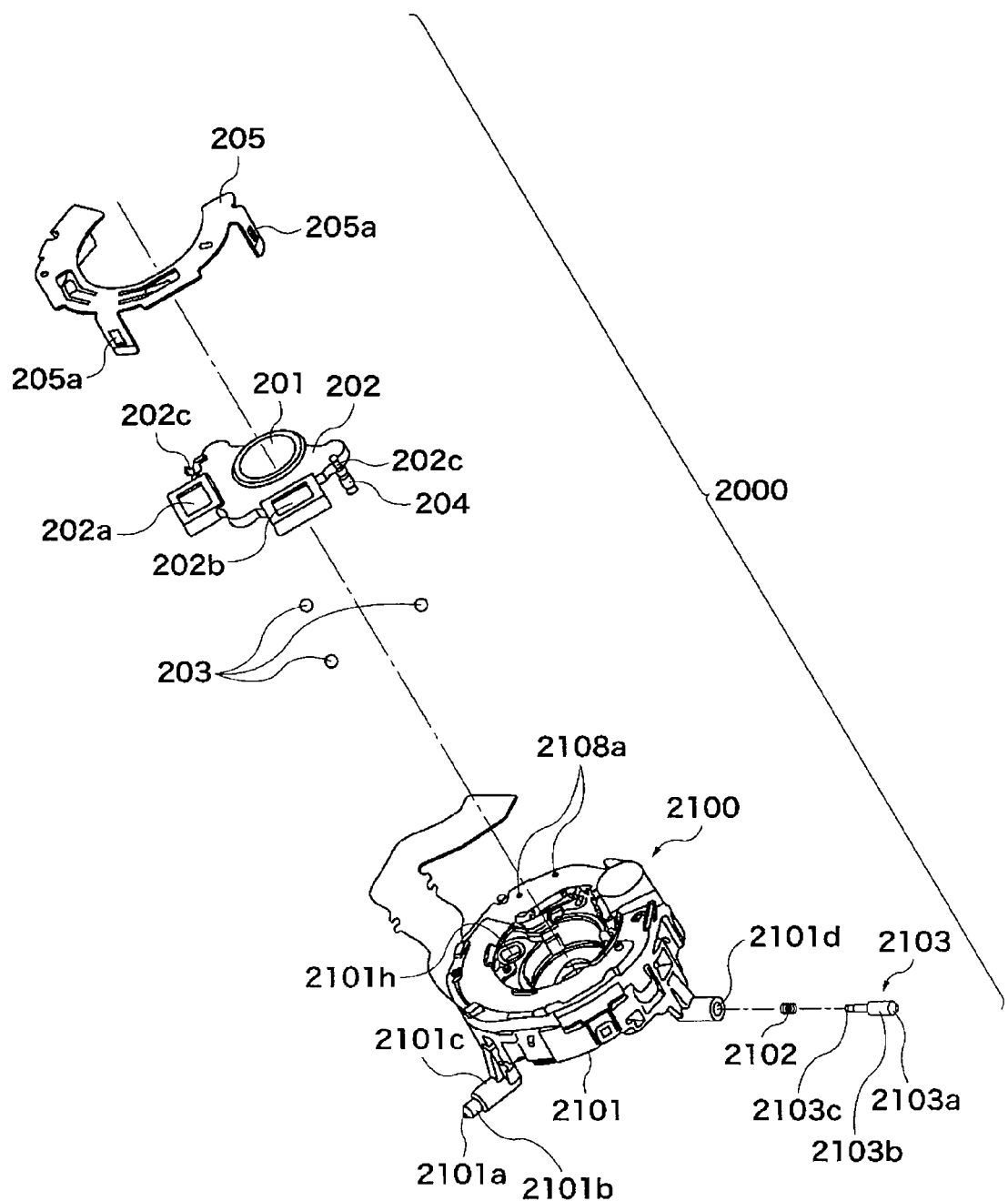
FIG. 4A is an exploded perspective view of a second group unit.
Figure 4B:
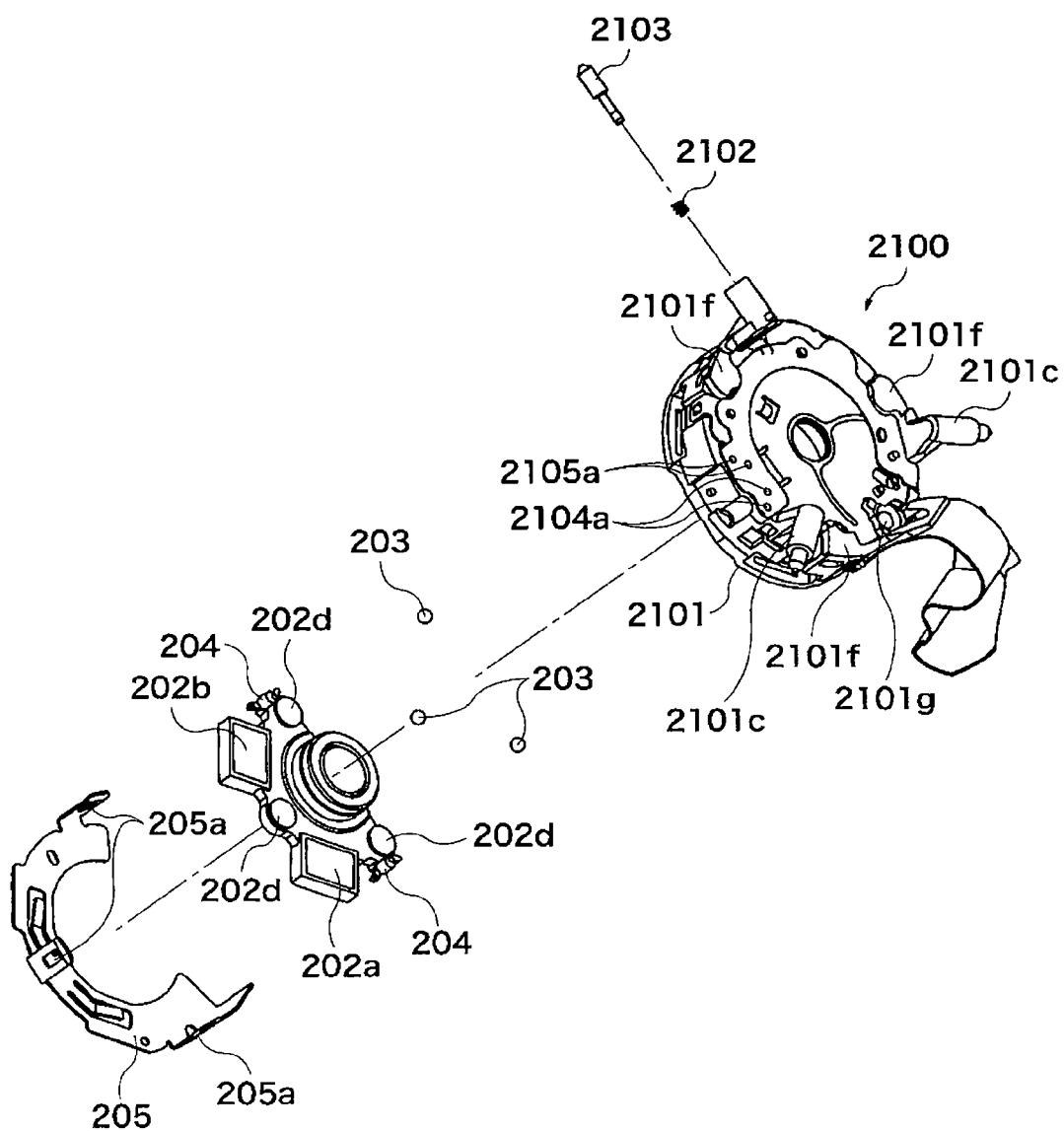
FIG. 4B is another exploded perspective view of the second group unit.
Figure 5:
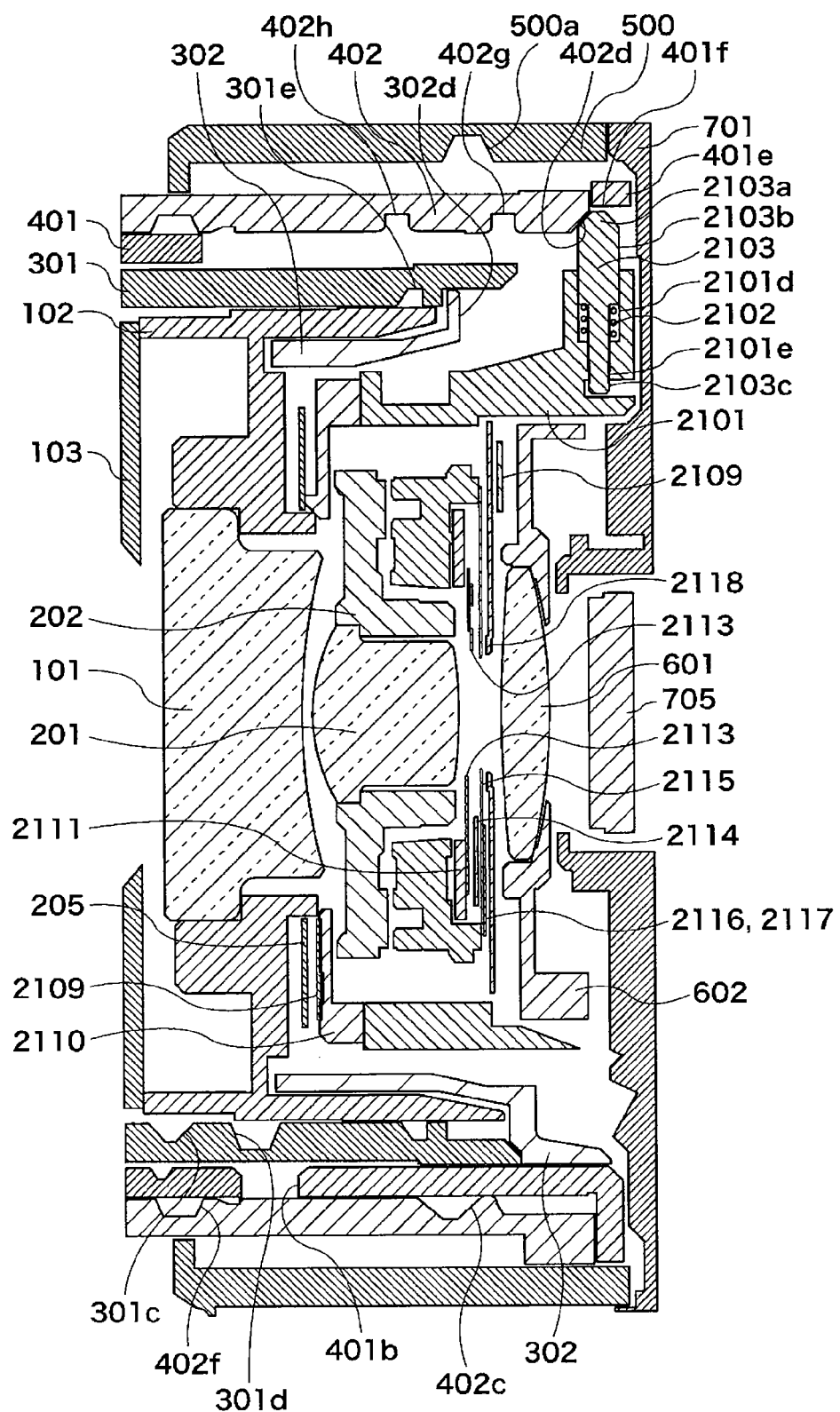
FIG. 5 is a cross-sectional view of the zoom lens barrel in a retracted position.
Figure 6:
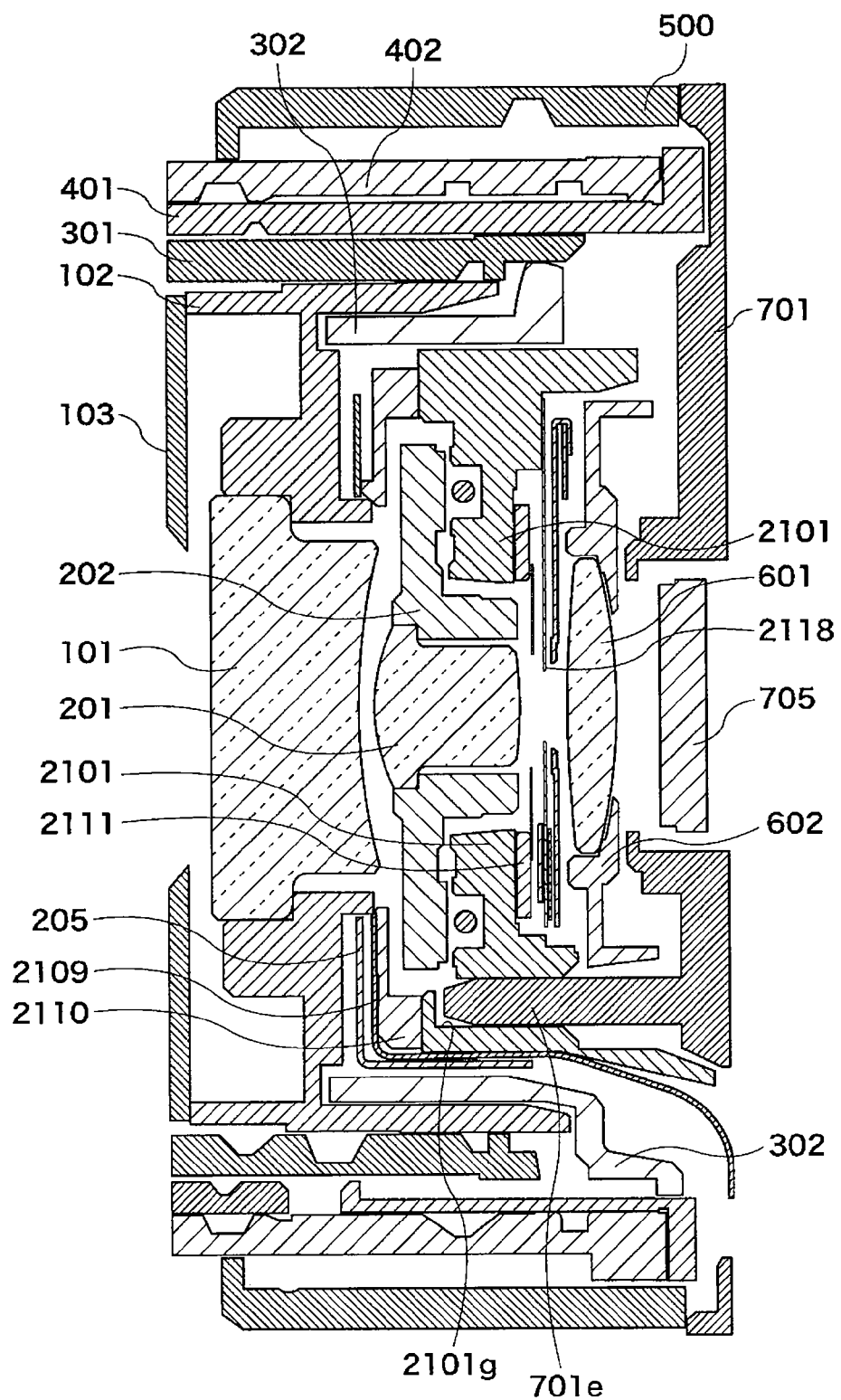
FIG. 6 is another cross-sectional view of the zoom lens barrel in the retracted position.

FIGS. 4A and 4B are exploded perspective views of the second group unit 2000. FIG. 5 is a cross-sectional view of the zoom lens barrel 50 in the retracted position. The second group unit 2000 comprises a second lens group 201, a second lens group-holding member 202, three ball members 203, and the aperture shutter unit 2100. FIG. 6 is another cross-sectional view of the zoom lens barrel 50 in the retracted position.

The second lens group 201 is integrated into the second lens group-holding member 202, described hereinafter. A second group base member 2101 is supported by a third cam barrel 402 (see FIG. 1). On the outer peripheral surface of the second group base member 2101, there are formed two sets of follower parts 2101a, rectilinear motion guides 2101b, and follower bases 2101c, at respective two circumferential locations.

Further, the outer peripheral surface of the second group base member 2101 is formed with a hole 2101d and a retaining hole 2101e coaxial with the hole 2101d (see FIG. 5). The two sets of the follower parts 2101a, the rectilinear motion guides 2101b, and the follower bases 2101c, and the one pair of the hole 2101d and the retaining hole 2101e are located at angular intervals of 120 degrees along the circumferential direction of the second group base member 2101. As described above, the outer peripheral surface of the second group base member 2101 is formed with the multiple cam followers.

A spring member 2102 is mounted in the hole 2101d formed in the second group base member 2101. One end of a movable follower 2103 forms a movable follower part 2103a. The outer periphery of the movable follower 2103 forms a rectilinear motion guide 2103b, and has the same diameter as that of the two rectilinear motion guides 2101b.

The movable follower 2103 is mounted in the hole 2101d of the second group base member 2101. The mounting of the movable follower 2103 is performed while urging the spring member 2102. An end 2103c of the movable follower 2103 is slightly larger in outer diameter than the retaining hole 2101e, so that once the end 2103c of the movable follower 2103 has been passed through the retaining hole 2101e, the movable follower 2103 becomes incapable of coming off therefrom (see FIG. 5).

Further, the second group base member 2101 is formed with three receiving surfaces 2101f (see FIG. 4B) which can be brought into contact with spring members 702 mounted on a base member 701, referred to hereinafter, at respective three circumferential locations, and a guide hole 2101g slidably fitted on a guide shaft 701e (see FIG. 6).

Figure 7:
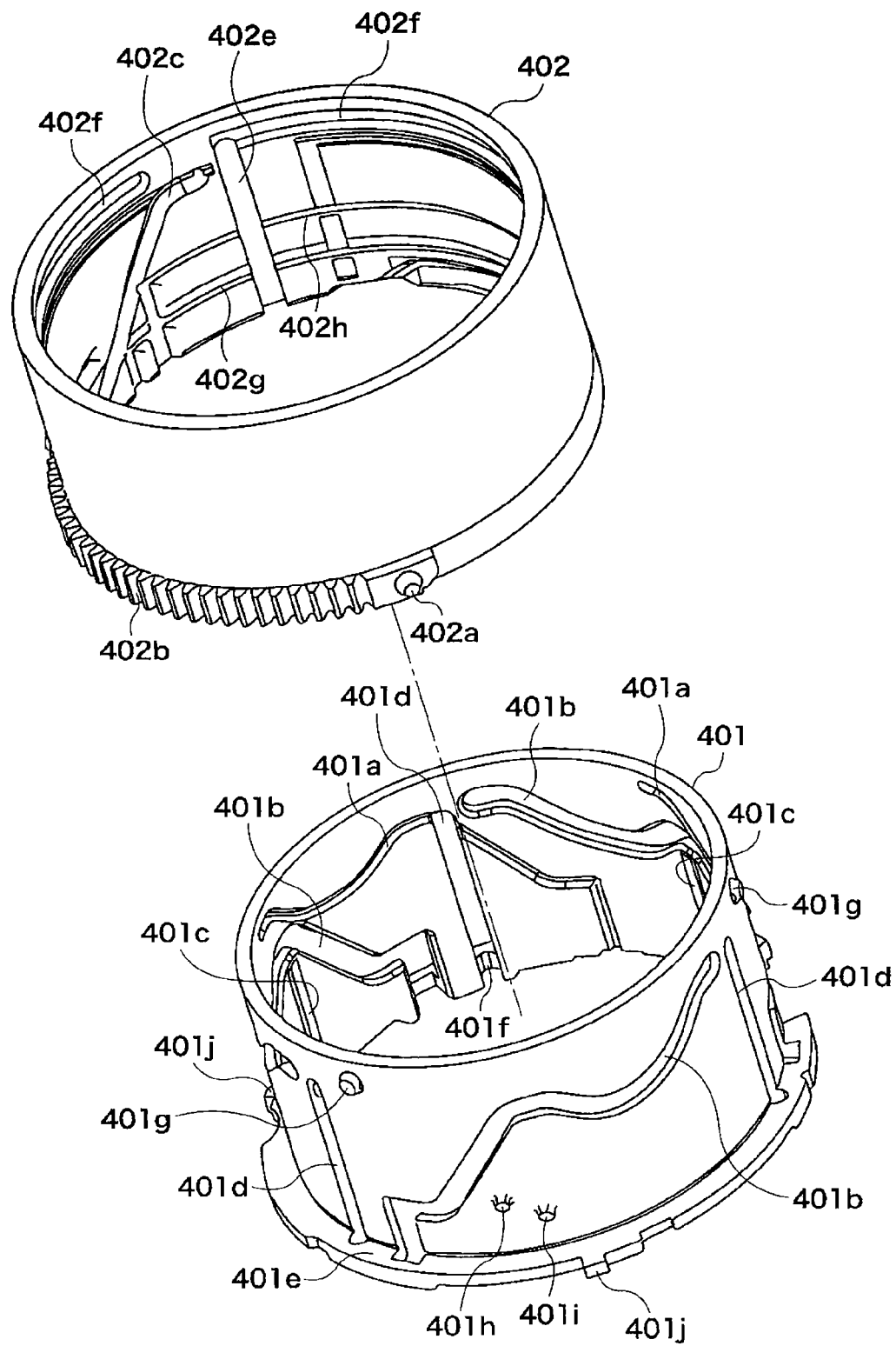
FIG. 7 is an exploded perspective view of a second movable cam unit.

The other component parts and elements of the second group unit 2000 will be described in detail hereinafter. FIG. 7 is an exploded perspective view of the second movable cam unit 400. The second movable cam unit 400 is formed by a second cam barrel 401 and the third cam barrel 402. The second cam barrel 401 has an inner peripheral surface thereof formed with three cam grooves 401a for engagement with the respective three cam followers 301a of the first cam barrel 301, and three cam holes 401b through which the respective three drive pins 301b of the same are inserted. Each cam groove 401a and each cam hole 401b associated with each other define respective cam paths substantially parallel to each other. Further, in the inner peripheral surface of the second cam barrel 401, there are formed rectilinear motion-guiding grooves 401c for engagement with the respective rectilinear slide key portions 302c at respective three circumferential locations.

In the inner peripheral surface of the second cam barrel 401, there are also formed rectilinear motion-guiding grooves 401d for having the respective rectilinear motion guides 2101b and 2103b of the aperture shutter unit 2100 slidably inserted therein, at respective three circumferential locations, in a manner such that the rectilinear motion-guiding grooves 401d extend through a flange portion 401e of the second cam barrel 401. Further, rectilinear motion-guiding groove bottomed parts 401f are formed where the respective rectilinear motion-guiding grooves 401d extend through the flange portion 401e, at respective three circumferential locations.

Figure 8A:
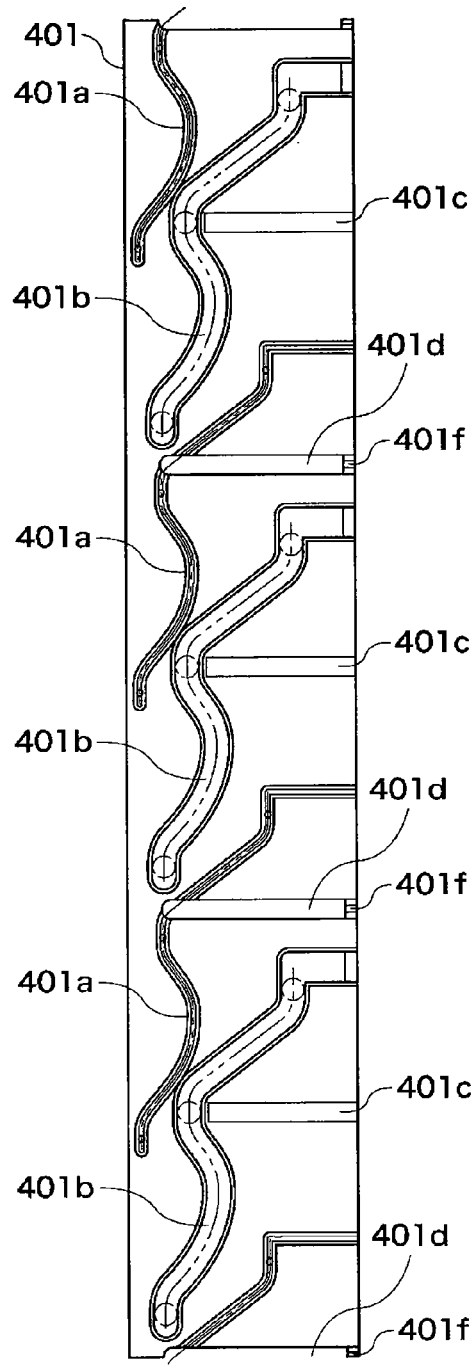
FIGS. 8A and 8B are unfolded views of a second cam barrel.
Figure 8B:
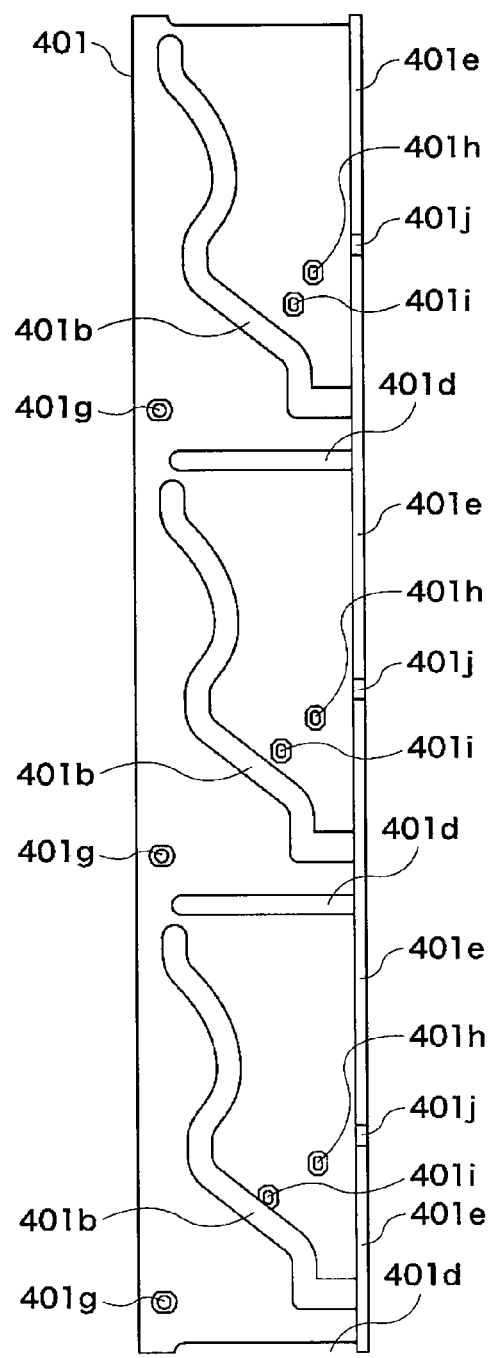

FIGS. 8A and 8B are unfolded views of the second cam barrel 401. FIG. 8A is an unfolded view of the inner peripheral surface of the second cam barrel 401, and FIG. 8B is an unfolded view of the outer peripheral surface of the second cam barrel 401. On the outer peripheral surface of the second cam barrel 401, there are formed three tapered pin portions 401g and three protrusions 401h at respective three locations, such that each tapered pin portion 401g and each protrusion portion 401h associated therewith are in the same positional relationship in the circumferential direction and the optical axis direction. Further, on the outer peripheral surface of the second cam barrel 401, there are formed three protrusions 401i different from each other in positional relationship in the optical axis direction. Three rectilinear slide key portions 401j are formed in the flange portion 401e at respective three circumferential locations.

The third cam barrel 402 (second hollow cylindrical unit) two stages lower than the first group barrel 102 has an outer peripheral surface thereof formed with three cam followers 402a at respective three circumferential locations, and a gear portion 402b. FIG. 9 is an unfolded view showing the inner peripheral surface of the third cam barrel 402. In the inner peripheral surface of the third cam barrel 402, there are formed two cam grooves 402c for engagement with the respective follower parts 2101a of the aperture shutter unit 2100, and a cam groove 402d for engagement with the movable follower part 2103a of the same.

Further, in the inner peripheral surface of the third cam barrel 402, there are formed three rectilinear motion-guiding grooves 402e at respective three circumferential locations, for engagement with the respective drive pins 301b of the first cam barrel 301. Furthermore, in the inner peripheral surface of the third cam barrel 402, there are formed recesses 402f, recesses 402h, and recesses 402g, at respective circumferential locations, for engagement with the tapered pin portions 401g, protrusions 401h, and protrusions 401i of the second cam barrel 401, respectively. With this arrangement, the second cam barrel 401 and the third cam barrel 402 are restrained from moving in the optical axis direction and are rotatable relative to each other.

Figure 10:
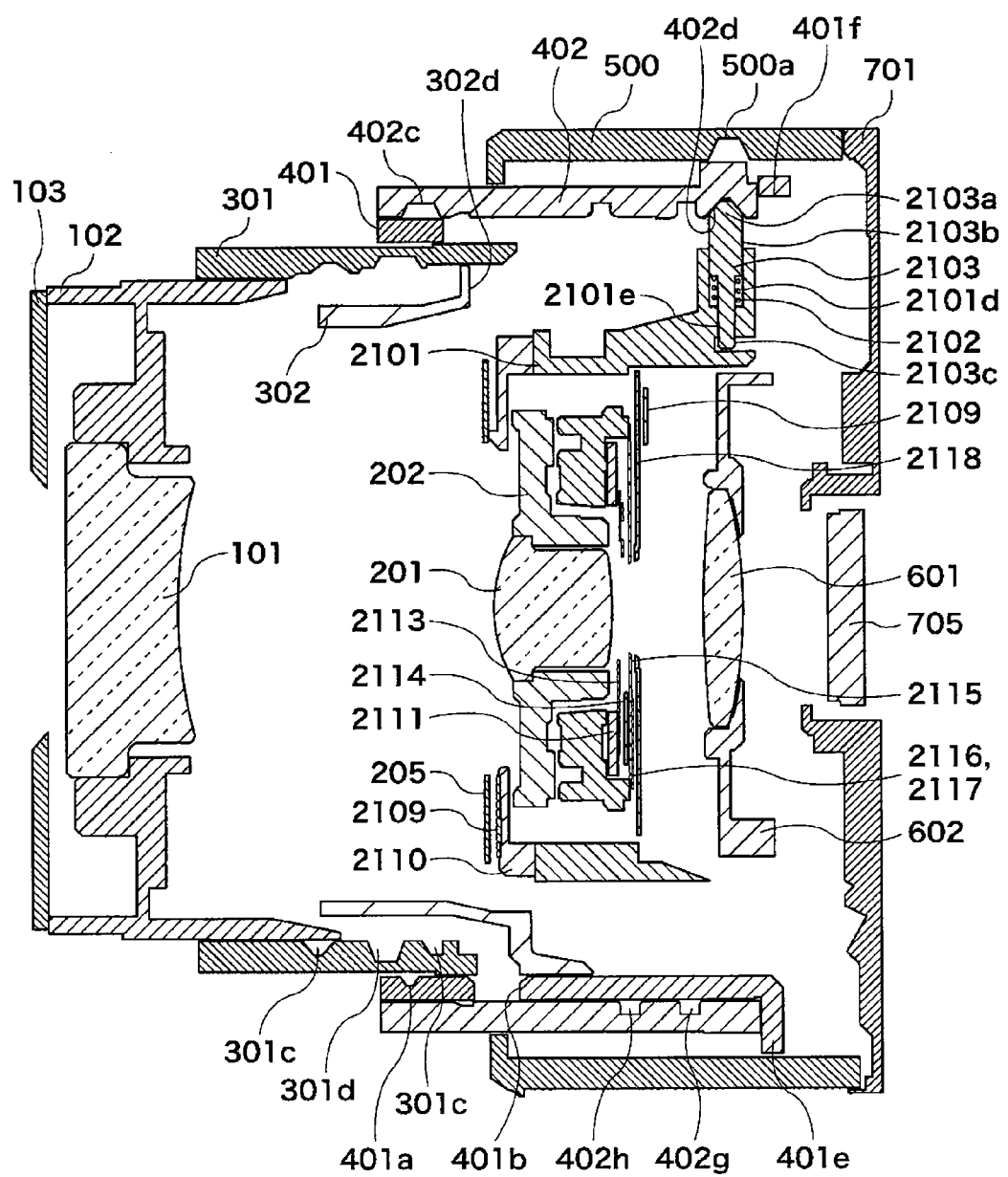
FIG. 10 is a cross-sectional view of the zoom lens barrel in a wide-angle position.
Figure 11:
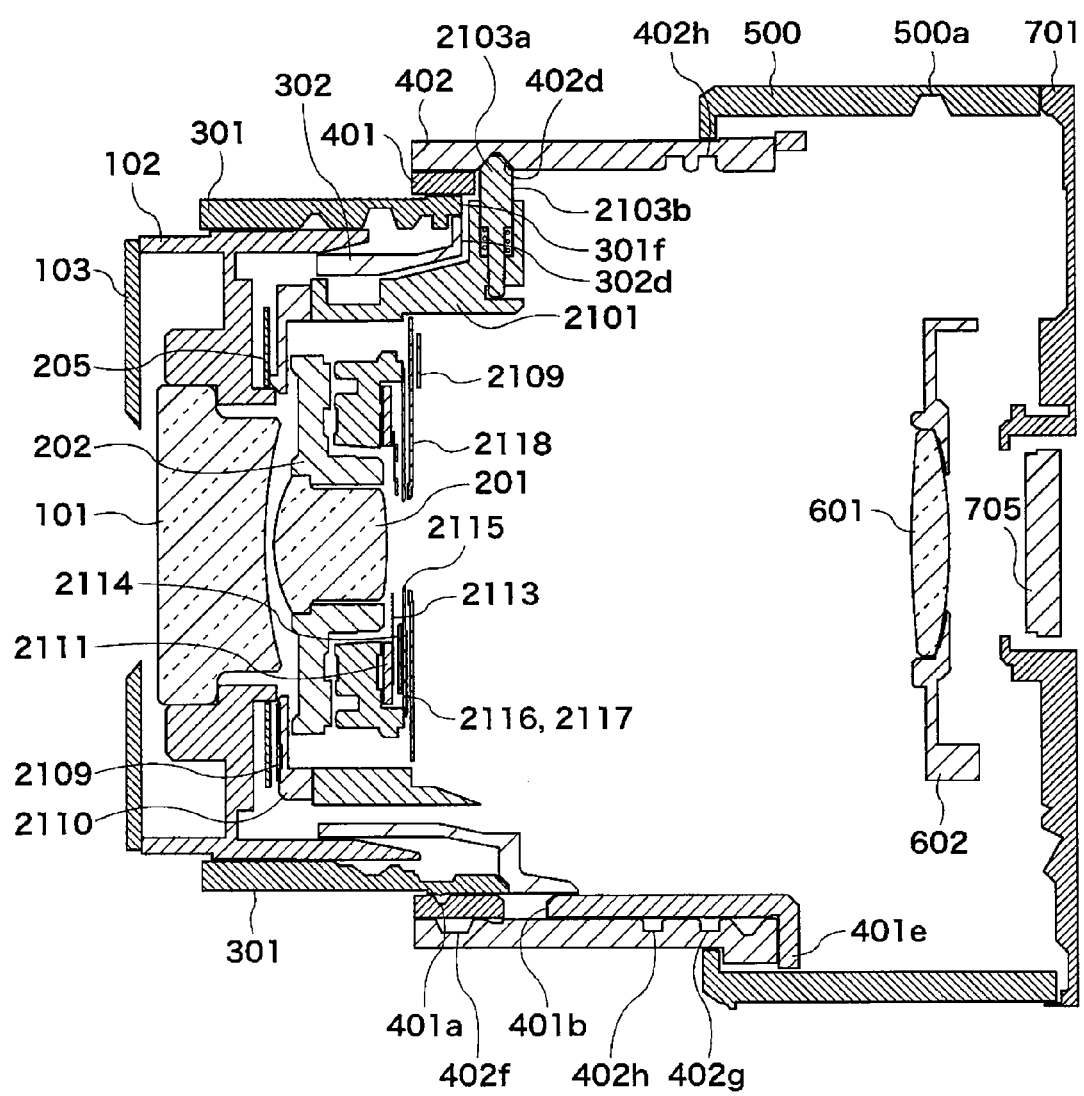
FIG. 11 is a cross-sectional view of the zoom lens barrel in a telephoto position.

FIG. 10 is a cross-sectional view of the zoom lens barrel 50 in a wide-angle position. FIG. 11 is a cross-sectional view of the zoom lens barrel 50 in a telephoto position. Now, the cam grooves 402c and 402d will be described in detail with reference to FIGS. 9, 10, and 11.

A in FIG. 9 indicates a range from the retracted position to the wide-angle position. B in FIG. 9 indicates a range from the wide-angle position to the telephoto position. The cam grooves 402c and 402d define respective cam paths substantially parallel to each other.

The cam grooves 402c and 402d have the same sectional shape within ranges indicated by F and J, respectively, in FIG. 9. The follower parts 2101a and the movable follower part 2103a of the aperture shutter unit 2100 are brought into engagement with the cam grooves 402c and the cam groove 402d, respectively. At this time, the movable follower 2103 receives a reaction force from the cam groove 402d by being urged by the spring member 2102, whereby the follower part 2101a is brought into pressure contact with the cam groove 402c (see the wide-angle position in FIG. 10 and the telephoto position in FIG. 11).

The cam grooves 402c are formed to have the same cam depth throughout the whole range (indicated by C+D+E in FIG. 9). In the range indicated by C in FIG. 9, the cam groove 402c has a shape of a cam cross-section that allows the follower part 2101a to be in contact with only one of opposed cam surfaces of the cam groove 402c. In the range indicated by F in FIG. 9, the cam groove 402c is formed to have only one cam surface with which the follower part 2101a is brought into contact. In the range indicated by E in FIG. 9, the cam groove 402c has a shape of a cam cross-section that allows the follower part 2101a to be also in contact with the other cam surface. In the range indicated by D in FIG. 9, the cam groove 402c is formed such that the shape of its cam cross-section progressively changes from that in the range C to that in the range E.

In a range indicated by G in FIG. 9, the cam groove 402d is formed to have a deeper cam depth than in a range indicated by I, and has a cross-sectional shape that allows the movable follower part 2103a to be in contact with only one of opposed cam surfaces thereof (see the retracted position in FIG. 5). In the range G, the movable follower 2103 is in a state where the urging force of the spring member 2102 is restrained by the retaining hole 2101e and the movable follower 2103 receives no reaction force from the cam groove 402d.

Further, in a range J in FIG. 9, the cam groove 402d is formed to have only a cam surface with which the movable follower part 2103a is brought into contact. In the range indicated by I in FIG. 9, the cam groove 402d has a shape of a cam cross-section that allows the movable follower part 2103a to be also in contact with the other cam surface well.

In a range indicated by H in FIG. 9, the cam groove 402d is formed such that the shape of its cam cross-section progressively changes from that in the range G to that in the range I.

Figure 12:
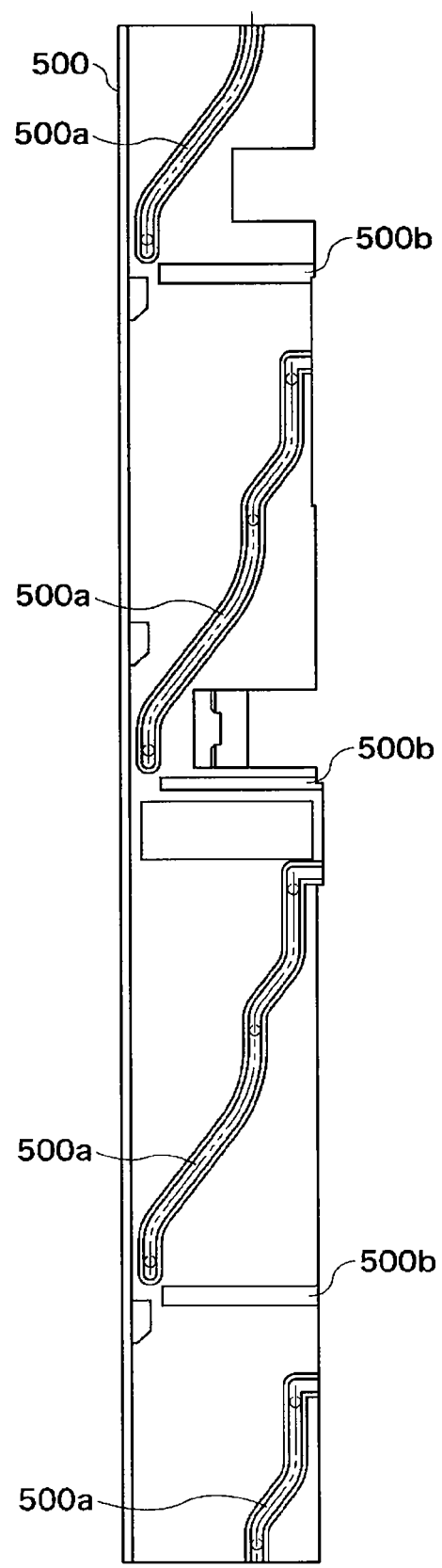
FIG. 12 is an unfolded view showing the inner peripheral surface of a fixed barrel.

FIG. 12 is an unfolded view showing the inner peripheral surface of the fixed barrel 500. In the inner peripheral surface of the fixed barrel 500, there are formed three cam grooves 500a for engagement with the respective cam followers 402a of the third cam barrel 402 at respective three circumferential locations. Further, in the inner peripheral surface of the fixed barrel 500, there are formed three rectilinear motion-guiding grooves 500b for engagement with the respective rectilinear slide key portions 401j of the second cam barrel 401 at respective three circumferential locations. The fixed barrel 500 is fixedly mounted on the base member 701, referred to hereinafter.

Figure 13:
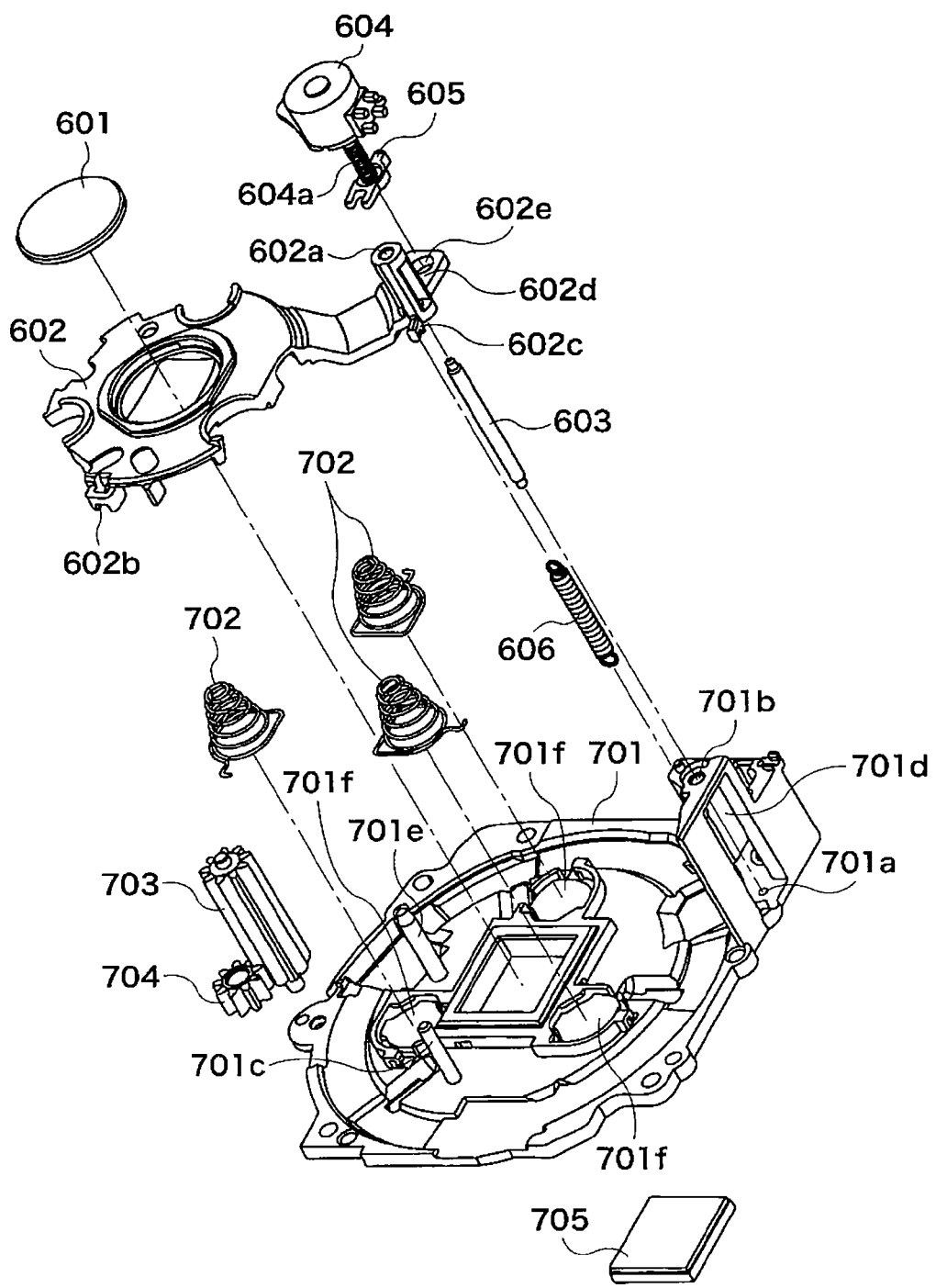
FIG. 13 is an exploded perspective view of a third group unit and a base unit.
Figure 14:
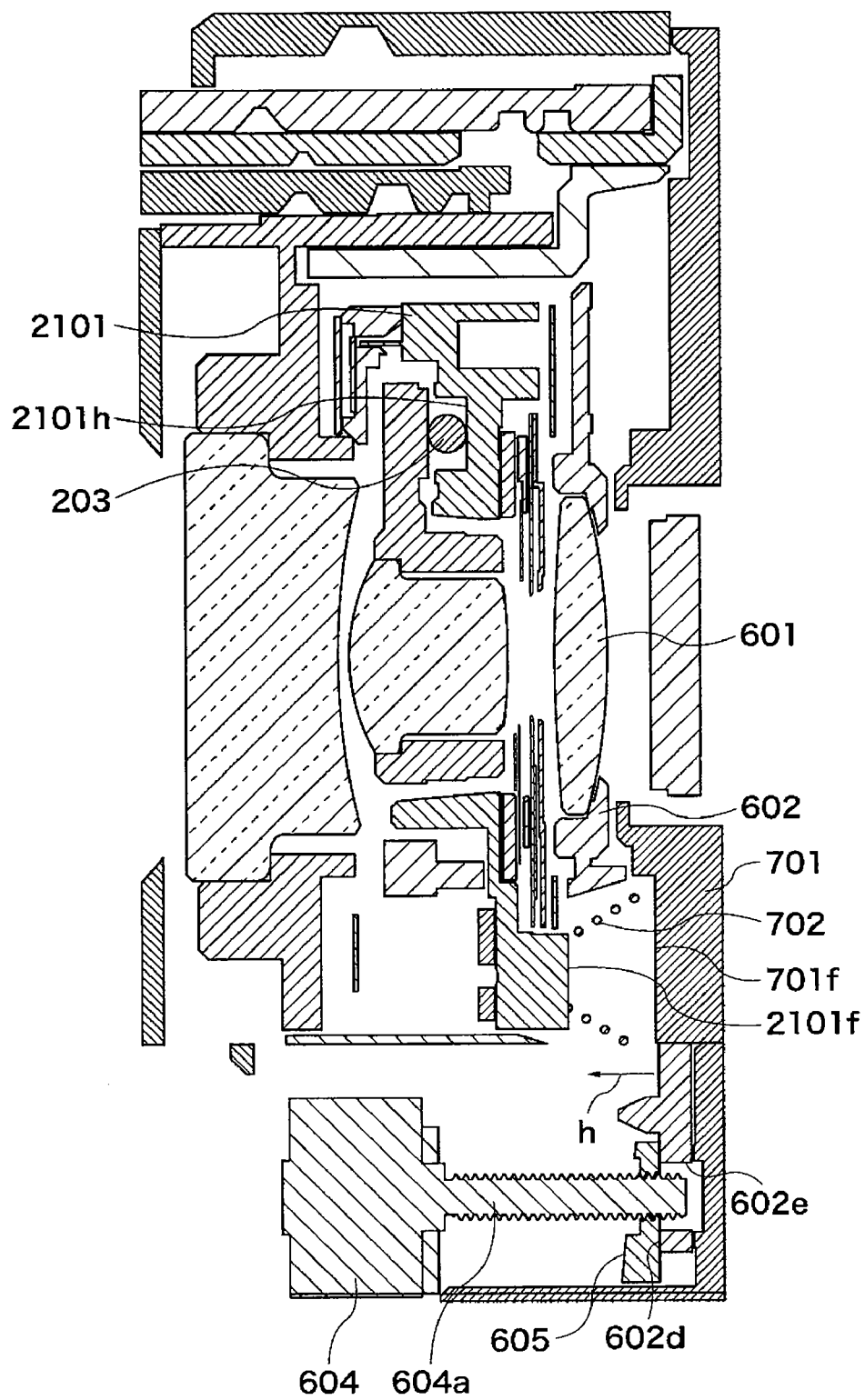
FIG. 14 is a cross-sectional view of the zoom lens barrel including the third group unit, in the retracted position.

FIG. 13 is an exploded perspective view of the third group unit 600 and the base unit 700. FIG. 14 is a cross-sectional view of the zoom lens barrel 50 including the third group unit 600, in the retracted position. A third lens group-holding member 602 holds a third lens group 601. The third lens group-holding member 602 includes a main guide portion 602a and a sub guide portion 602b. Further, the third lens group-holding member 602 is formed with a spring hook portion 602c, a receiving portion 602d, and a through hole 602e.

A guide member 603 is fitted in the main guide portion 602a of the third lens group-holding member 602. A stepper motor 604 has a screw part 604a. A nut member 605 is screwed (screw-coupled) into the screw part 604a.

The base member 701 has guide fixing portions 701a and 701b in which the guide member 603 is fixedly press-fitted, and a guide shaft 701c on which the sub guide portion 602b is fitted in a manner slidable in the optical axis direction.

Further, the base member 701 is formed with a spring hook portion 701d for a spring member 606. Furthermore, the base member 701 has the guide shaft 701e to be slidably fitted in the guide hole 2101g of the second group base member 2101.

The spring member 702 is attached to a receiving surface 701f of the base member 701, for urging the second group base member 2101 toward the first lens group 101 in the retracted position. A gear member 703 is rotatably mounted on the fixed barrel 500, and meshes (gear-coupled) with the gear portion 402b of the third cam barrel 402. A gear member 704, which meshes (gear-coupled) with the gear member 703, is driven for rotation by a drive source (not shown). The CCD (Charge Coupled Device) sensor 705 is fixed to the base member 701.

Figure 15A:
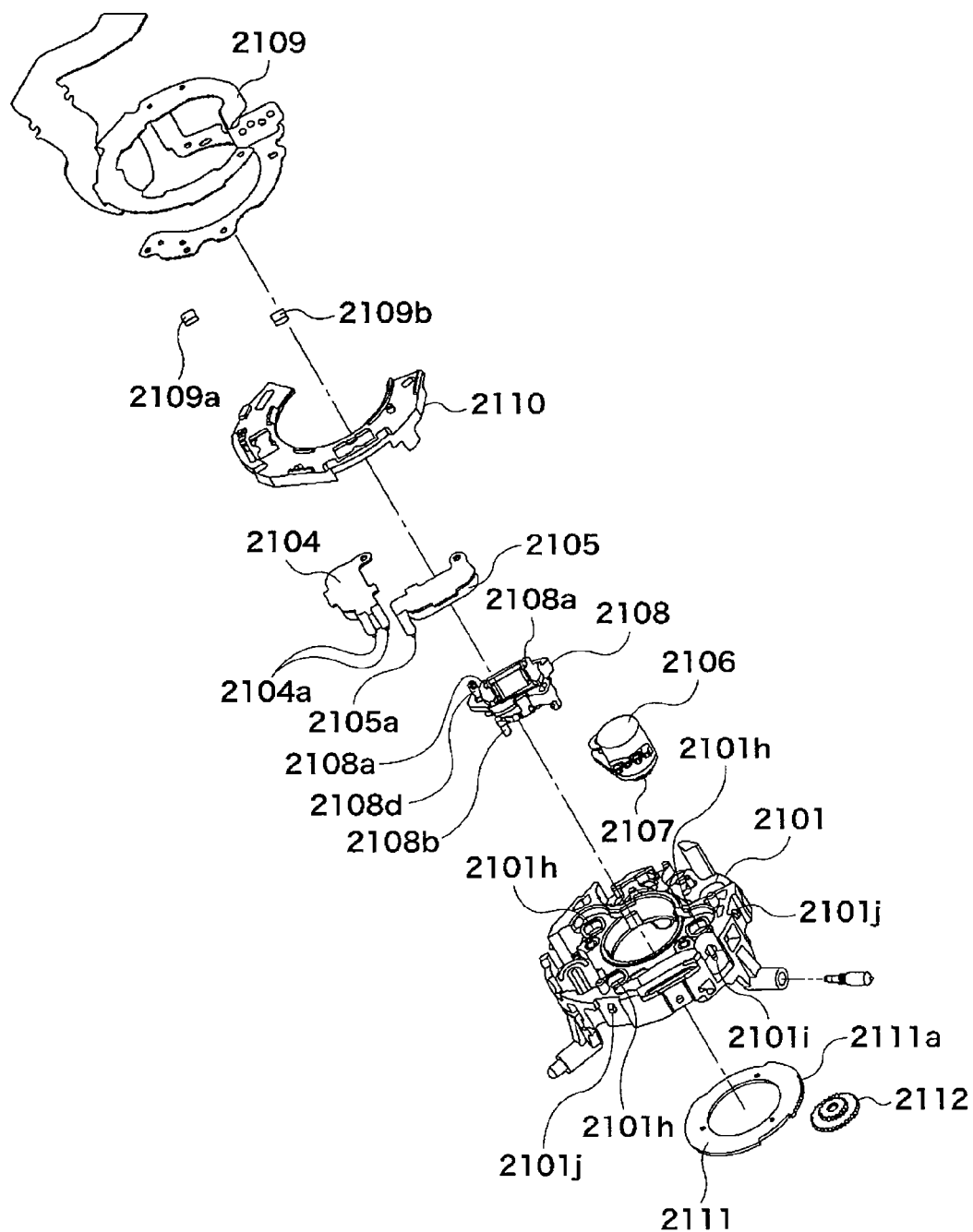
FIG. 15A is an exploded perspective view of an aperture shutter unit.
Figure 15B:
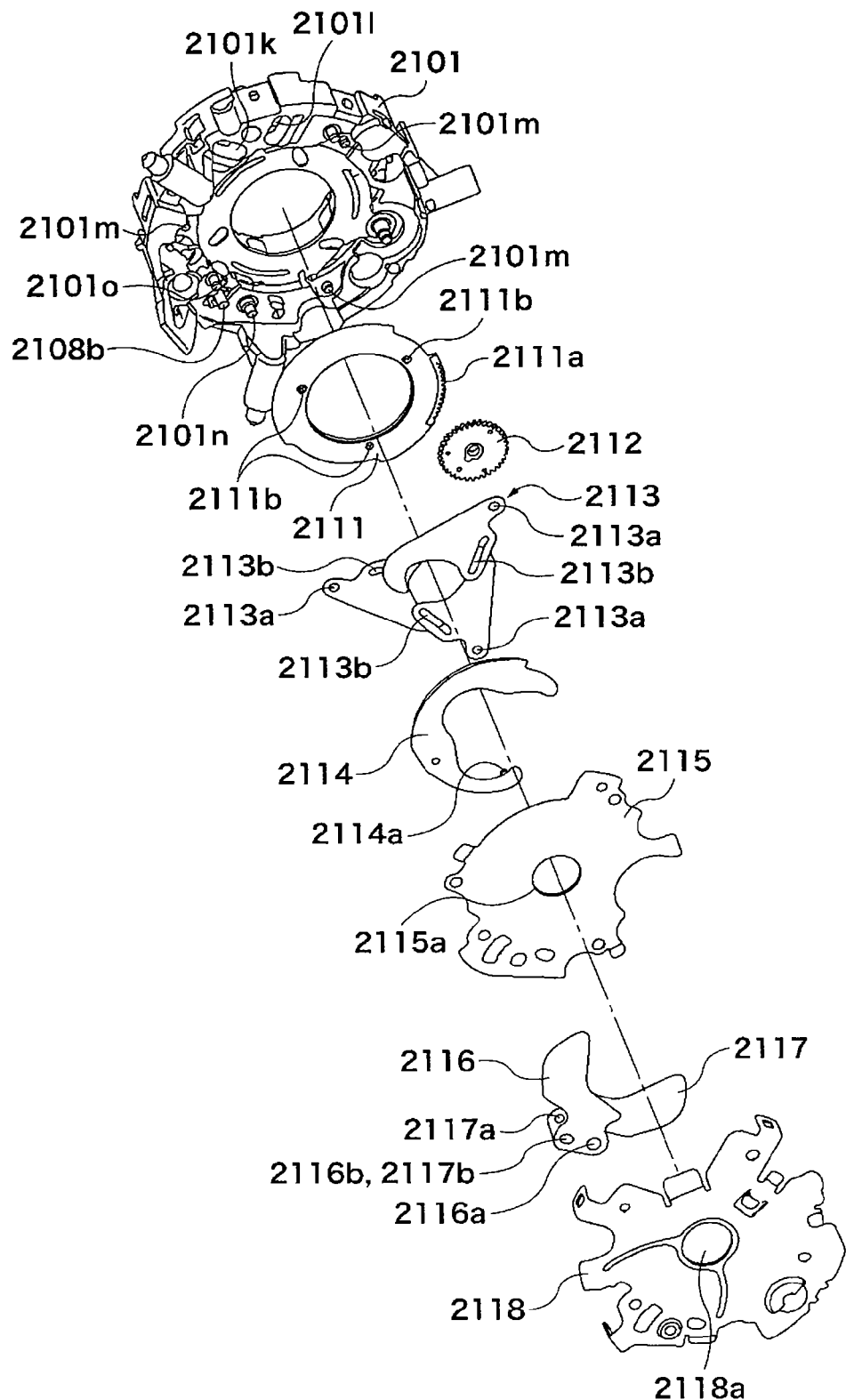
FIG. 15B is another exploded perspective view of the aperture shutter unit.

Next, a description will be given of the aperture shutter unit 2100. FIGS. 15A and 15B are exploded perspective views of the aperture shutter unit 2100.

The second group base member 2101 has three ball receiving portions 2101h formed at respective three circumferential locations. Further, the second group base member 2101 has two spring hook portions 2101i formed at respective two circumferential locations and three pawl portions 2101j formed at respective three circumferential locations.

Coil members 2104 and 2105 have respective pairs of terminals 2104a and 2105a. The terminals 2104a and 2105a are inserted through respective through holes 2101k and 2101l formed in the second group base member 2101, whereby the coil members 2104 and 2105 are attached to the second group base member 2101.

A stepper motor 2106 has a gear member 2107 attached thereto. A shutter driving unit 2108 has two coil terminals 2108a. The shutter driving unit 2108 is mounted to the second group base member 2101 with the coil terminals 2108a directed toward the object side. Further, the shutter driving unit 2108 has an arm 2108b integral with a magnet.

A flexible wiring board 2109 is connected to a camera body (not shown). Hall elements 2109a and 2109b are mounted to the flexible wiring board 2109. Further, the flexible wiring board 2109 is electrically connected to each of the terminals 2104a and 2105a of the coil members 2104 and 2105, terminals, not shown, of the stepper motor 2106, and the coil terminals 2108a of the shutter driving unit 2108.

Further, the flexible wiring board 2109 includes a connecting part 2109c (see FIGS. 17A and 17B) for connecting between portions electrically connected to the terminals of the stepper motor 2106 and the coil terminals 2108a of the shutter driving unit 2108, and portions electrically connected to the terminals of the coil members 2104 and 2105. A holding member 2110 holds the flexible wiring board 2109 and is fixed by adhesive to the flexible wiring board 2109.

An aperture cam member 2111 is formed with a gear portion 2111a. The aperture cam member 2111 is attached to the second group base member 2101 in a manner rotatable about the optical axis.

A gear member 2112 is rotatably attached to the second group base member 2101 and is meshed (gear-coupled) with the gear member 2107 and the gear portion 2111a of the aperture cam member 2111.

Each of three aperture blades 2113 is formed with a hole 2113a and a cam hole 2113b. Each of the holes 2113a is rotatably fitted on an associated one of shafts 2101m of the second group base member 2101.

An aperture cover member 2114 has three cam shafts 2114a at respective three circumferential locations. Each of the aperture blades 2113 is fixed to an associated hole 2111b of the aperture cam member 2111 by press-fitting in a state in which a sufficient space is secured in the optical axis direction for enabling the operation thereof, and rotates in unison with the aperture cam member 2111. At this time, the cam holes 2113b are slidably fitted on the respective associated cam shafts 2114a of the aperture cover member 2114.

A plate member 2115 has an opening 2115a and is attached to the second group base member 2101. Shutter blades 2116 and 2117) are formed with holes 2116a and 2117a and slots 2116b and 2117b, respectively. The holes 2116a and 2117a are rotatably fitted on shafts 2101n and 2101o of the second group base member 2101, respectively. The slots 2116b and 2117b are slidably fitted on the arm 2108b of the shutter driving unit 2108.

A cover member 2118 has an opening 2118a and is attached to the second group base member 2101 in a state in which a sufficient space is secured in the optical axis direction for enabling the operation of each of the shutter blades 2116 and 2117.

Figure 16A:
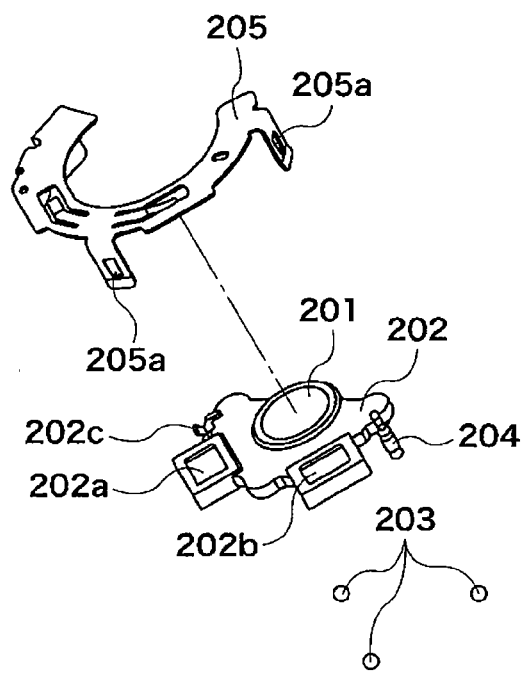
FIG. 16A is an exploded perspective view showing component parts of the second group unit.

FIG. 16A is an exploded perspective view showing component parts of the second group unit 2000. The second group unit 2000 includes the second lens group 201, the second lens group-holding member 202, magnets 202a and 202b, and a spring hook portion 202c.

The magnets 202a and 202b are opposed to the respective coil members 2104 and 2105. The magnetic fields of the magnets 202a and 202b are detected by the respective hall elements 2109a and 2109b.

Three ball members 203 are received in the respective ball receiving portions 2101h formed in the second group base member 2101 at the respective three circumferential locations. A spring member 204 is hooked to the spring hook portions 202c and 2101i, and the ball members 203 are sandwiched between the receiving surfaces 202d of the second lens group-holding member 202 and the respective ball receiving portions 2101h, respectively. A cover member 205 is formed with holes 205a. The holes 205a are engaged with the respective pawl portions 2101j, whereby the cover member 205 is attached to the aperture shutter unit 2100.

These components are mounted in the aperture shutter unit 2100 to form the second group unit 2000.

In the zoom lens barrel 50 constructed as above, the magnetic fields generated by energizing the coil members 2104 and 2105 act on the magnets 202a and 202b, whereby the second lens group-holding member 202 is moved in a direction orthogonal to the optical axis. The position of the second lens group-holding member 202 can be detected by the hall elements 2109a and 2109b. The above-described construction and driving control are well-known as a shake correcting unit, as disclosed e.g. in Japanese Patent Laid-Open Publication No. 2005-173412.

Figure 16B:
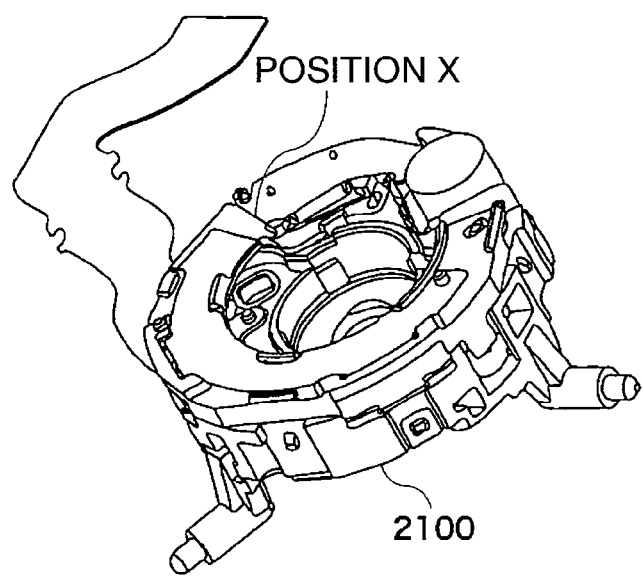
FIG. 16B is a perspective view showing how the component parts of the second group unit are mounted in the aperture shutter unit.
Figure 16C:
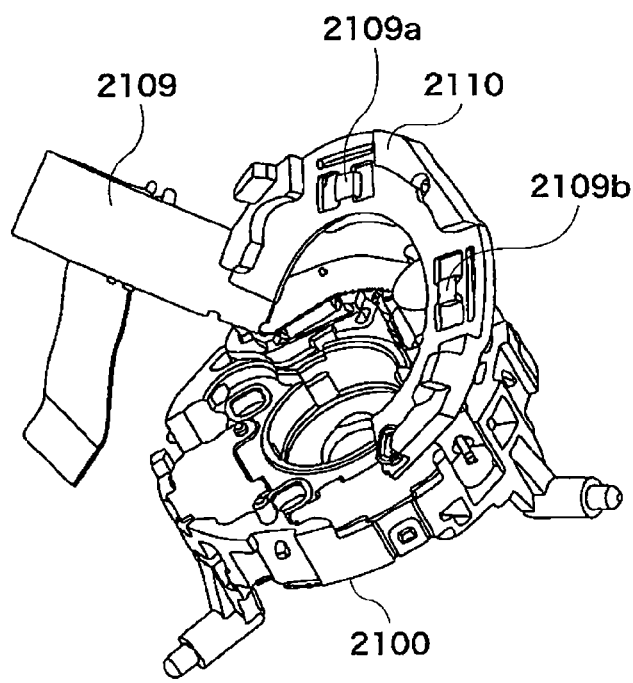
FIG. 16C is another perspective view showing how the component parts of the second group unit are mounted in the aperture shutter unit.

FIGS. 16B and 16C are perspective views showing how the component parts of the second group unit 2000 are mounted on the aperture shutter unit 2100. When mounting the component parts of the second group unit 2000 on the aperture shutter unit 2100, it is possible to open the holding member 2110 having the flexible wiring board 2109 fixed by adhesive thereto, in a manner folded back at a position X, and mount the component parts in the aperture shutter unit 2100. FIG. 16C shows the state where the holding member 2110 is opened.

Figure 17A:
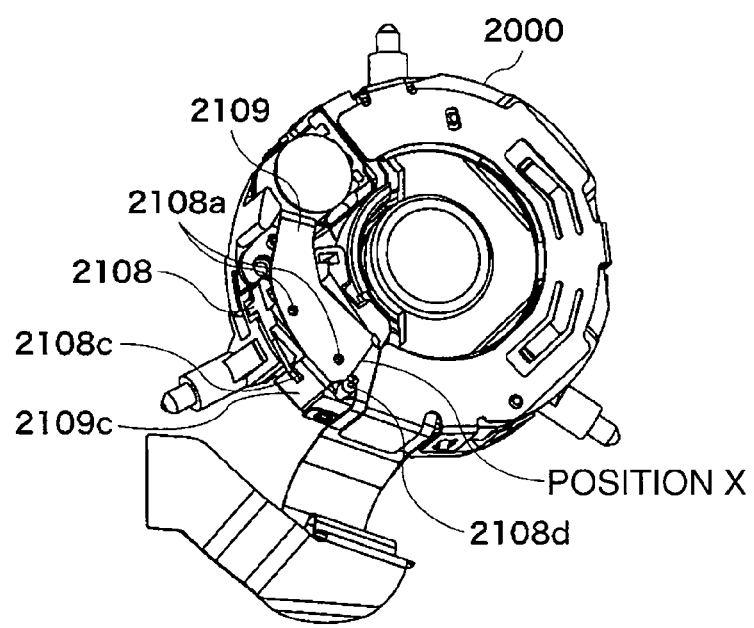
FIG. 17A is a perspective view of the second group unit, as viewed from the front side.
Figure 17B:
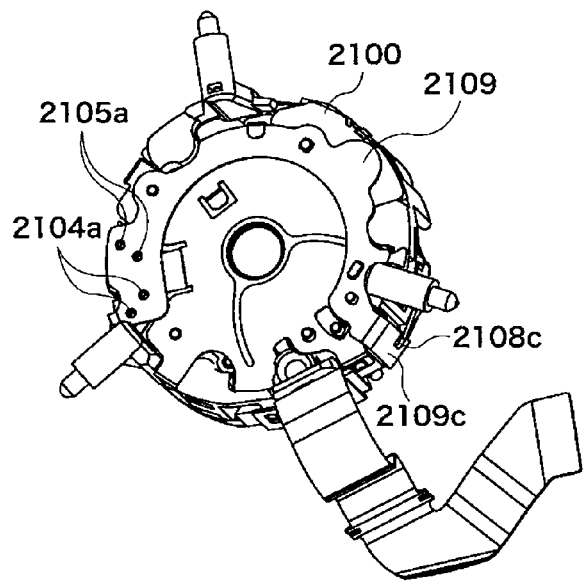
FIG. 17B is a perspective view of the second group unit, as viewed from the reverse side.

FIG. 17A is a perspective view of the second group unit 2000, as viewed from the front side, i.e. from the object side in the optical axis direction. FIG. 17B is a perspective view of the second group unit 2000, as viewed from the rear thereof, i.e. from the image-forming surface side in the optical axis direction. The shutter driving unit 2108 has a protrusion 2108d formed at the position X. The protrusion 2108d serves to reduce a force applied to the coil terminals 2108a when the holding member 2110 having the flexible wiring board 2109 fixed by adhesive thereto is folded back at the position X.

Further, the shutter driving unit 2108 has an outer peripheral surface thereof formed with a pressing portion 2108c for pressing the connecting part 2109c of the flexible wiring board 2109 to prevent the same from expanding outward.

Next, a description will be given of the overall operation for zoom driving. FIG. 5 shows the zoom lens barrel 50 in the retracted position as mentioned hereinbefore. FIG. 10 shows the zoom lens barrel 50 in the wide-angle position, and FIG. 11 shows the zoom lens barrel 50 in the telephoto position.

When the gear member 704 is rotated by the drive source (not shown), the torque is transmitted to the gear portion 402b of the third cam barrel 402 via the gear member 703 to cause rotation of the third cam barrel 402. Since the cam followers 402a are in engagement with the cam grooves 500a of the fixed barrel 500, the third cam barrel 402 moves in the optical axis direction along the cam trajectory of the cam grooves 500a while rotating.

At this time, the tapered pin portions 401g and the protrusions 401h and 40i of the second cam barrel 401 are in engagement of with the respective recesses 402f, 402h, and 402g of the third cam barrel 402, whereby the motion of the second cam barrel 401 in the optical axis direction is restrained, and the second cam barrel 401 and the third cam barrel 402 are in a state rotatably coupled to each other.

Further, the rectilinear slide key portions 401j of the second cam barrel 401 are in engagement with the respective rectilinear motion-guiding grooves 500b of the fixed barrel 500, and hence the second cam barrel 401 rectilinearly moves in the optical axis direction with respect to the fixed barrel 500.

The drive pins 301b of the first cam barrel 301 are in engagement with the respective rectilinear motion-guiding grooves 402e of the third cam barrel 402, so that the rotation of the third cam barrel 402 causes rotation of the first cam barrel 301 as well.

Since the cam followers 301a are in engagement with the respective cam grooves 401a, the first cam barrel 301 moves in the optical axis direction along the cam trajectory of the cam grooves 401a while rotating. At this time, the protrusions 302b of the rectilinear motion barrel 302 are in engagement with the respective recesses 301e of the first cam barrel 301, whereby the motion of the rectilinear motion barrel 302 in the optical axis direction is restrained, and the first cam barrel 301 and the rectilinear motion barrel 302 are in a state rotatably coupled to each other. The rectilinear slide key portions 302c of the rectilinear motion barrel 302 are in engagement with the respective rectilinear motion-guiding grooves 401c of the second cam barrel 401, and hence the rectilinear motion barrel 302 rectilinearly moves in the optical axis direction with respect to the second cam barrel 401.

The main cam followers 102a of the first group barrel 102 are in engagement with the respective main cam grooves 301c of the first cam barrel 301, so that the first group barrel 102 moves in the optical axis direction along the cam trajectory of the main cam grooves 301c. At this time, the rectilinear motion-guiding protrusions 102c of the first group barrel 102 are in engagement with the respective rectilinear motion-guiding recesses 302a the rectilinear motion barrel 302, which restrains the rotation of the first group barrel 102, so that the first group barrel 102 rectilinearly moves in the optical axis direction.

Next, a description will be given of the zoom operation of the second group unit 2000. In the second group unit 2000, the follower parts 2101a and the movable follower part 2103a are in engagement with the cam grooves 402c and 402d of the third cam barrel 402, respectively.

Further, since the rectilinear motion guides 2101b and 2103b are in engagement with the respective rectilinear motion-guiding grooves 401d of the second cam barrel 401, the second group unit 2000 moves in the optical axis direction along the cam trajectory of the cam grooves 402c and 402d of the third cam barrel 402.

In the retracted position (see FIG. 14), the second group unit 2000 is in a state where the follower parts 2101a and the movable follower part 2103a thereof are in the ranges F and J indicated in FIG. 9, respectively, in which they are each in contact with one of the cam surfaces of an associated one of the cam grooves 402c and 402d by the urging force of the spring member 702.

The foremost ends of the follower parts 2101a and the movable follower part 2103a of the second group unit 2000 are positioned at such respective locations spaced from the associated rectilinear motion-guiding groove bottomed part 401f of the second cam barrel 401 by slight gaps, thereby limiting the motion of the second group unit 2000 in a radial direction to an extent corresponding to the gaps (see FIG. 5). The foremost end of each of the follower parts 2101a and the movable follower part 2103a corresponds to a first position restricting unit in the present invention.

Further, the guide shaft 701e of the base member 701 is fitted in the guide hole 2101g of the second group base member 2101 (see FIG. 6). More specifically, the guide shaft 701e is rectilinearly guided by the guide hole 2101g. The guide hole 2101g and the guide shaft 701e correspond to a second position restricting unit in the present invention.

It should be noted that the position of the second group unit 2000 in a direction orthogonal to the optical axis direction may be restricted by only one of the first position restricting unit and the second position restricting unit. Further, although in the present embodiment, the second position restricting unit is formed by the guide shaft 701e formed on the base member 701 and the guide hole 2101g, the sub guide portion 602b of the third lens group-holding member 602 and the guide shaft 701c slidably fitted in the sub guide portion 602b may be configured to also serve as the second position restricting unit.

When the third cam barrel 402 is rotated from this state, the second group unit 2000 moves from the retracted position to a shooting position (corresponding to movement of the follower parts 2101a and the movable follower part 2103a in the ranges A and B in FIG. 9). In other words, the second group unit 2000 is driven from the retracted position (see FIG. 5) to a shooting position, i.e. the wide-angle position (see FIG. 10) or the telephoto position (see FIG. 11).

In the telephoto position, the follower bases 2101c of the second group base member 2101 are positioned in the respective notches 301f of the first cam barrel 301 and the notches 302d of the rectilinear motion barrel 302 (see FIG. 11). By thus causing the follower bases 2101c to overlap the first cam barrel 301 as a second-stage cam barrel in the optical axis direction, it is possible to reduce the spacing between the first lens group and the second lens group.

Next, a description will be given of the operation of the third group unit (see FIGS. 13 and 14). The third group unit 600 is mounted on the base member 701.

First, the third lens group-holding member 602 holding the third lens group 601 is placed on the base member 701, and then the guide member 603 is fitted in the main guide portion 602a, whereby the main guide portion 602a is fixed to the guide fixing portion 701a. In this state, the spring member 606 is hooked to the spring hook portions 602c and 701d.

Then, the extreme end of the screw part 604a is inserted through the through hole 602e in a state where the nut member 605 has been screw-connected to the screw part 604a, whereby the stepper motor 604 is mounted to the base member 701.

Thus, the nut member 605 is urged toward the screw part 604a by the resilient force of the spring member 606 (see FIG. 19), and the third lens group-holding member 602 is brought into a state urged in an extension direction (direction indicated by an arrow h in FIG. 14). The stepper motor 604 of the third group unit mounted to the base member 701 is energized in this state to drive the third lens group-holding member 602, whereby a focusing operation is performed.

Next, a description will be given of the operation of the aperture shutter unit 2100. First, a stopping-down operation will be described.

When the stepper motor 2106 is energized, the rotation of the gear member 2107 is transmitted to the gear member 2112 and the gear portion 2111a, whereby the aperture cam member 2111 is rotated about the optical axis. At this time, each of the aperture blades 2113 rotates about the hole 2113a fitted on the associated shaft 2101m according to the cam trajectory of the cam hole 2113b. Thus, the aperture blades 2113 can be rotated to change the area of an aperture i.e. an opening defined thereby (see FIG. 15B).

Next, a description will be given of shutter operation. A magnetic field generated by energization of the shutter driving unit 2108 acts on the arm 2108b integral with the magnet, whereby the shutter driving unit 2108 pivotally moves about the optical axis. When the polarity of energization to the coil terminals 2108a is inverted, the direction of pivotal motion of the arm 2108b is reversed. The pivotal motion of the arm 2108b causes the shutter blades 2116 and 2117 to pivotally move about the respective shafts 2101n and 2101o to block an effective optical flux. Thus, the shutter blades 2116 and 2117 function as a shutter (see FIG. 15B).

In the zoom lens barrel 50 of the first embodiment, when it is in the retracted position, each of the follower parts 2101a of the second group unit 2000 and the movable follower part 2103a of the same is in contact with the one cam surface of the associated one of the cam grooves 402c and 402d. Thus, each of the cam grooves 402c and 402d can have a portion formed with only one cam surface, so as to bring the zoom lens barrel into the retracted state, which makes it possible to reduce the length of the third cam barrel 402 in the optical axis direction.

Further, in the ranges C and G in FIG. 9, the cam grooves 402c and the cam groove 402d are formed such that they have respective different shapes of cam cross-sections in association with the follower part 2101a and the movable follower part 2103a, respectively. This makes it possible to provide the second group base member 2101 with the follower parts 2101a and the movable follower 2103 to thereby achieve stable zoom driving of the second group unit 2000.

Further, by providing the first position restricting unit or the second position restricting unit, it is possible to restrict the position of the second group unit 2000 in a direction orthogonal to the optical axis direction to thereby stabilize the second group unit 2000 in the retracted position.

Each of the notches 301f is formed at a location avoiding the locations of the associated main cam groove 301c and the associated sub cam groove 301d of the first cam barrel 301, and each of the notches 302d of the rectilinear motion barrel 302 is formed at a location overlapping the associated notch 301f in the optical axis direction. Then, in the telephoto position, each of the follower bases 2101c is caused to be positioned in the associated notches 301f and 302d, whereby the space between the first group unit 100 and the second group unit 2000 is reduced.

Further, when integrating components into the second group unit 2000, the components can be mounted in a state in which the holding member 2110 having the flexible wiring board 2109 fixed by adhesive thereto is opened by being folded back at the position X, as shown in FIGS. 16B and 16C. This makes it easy to manage the aperture shutter unit 2100 as a unit.

As described above, the zoom lens barrel 50 of the first embodiment comprises the first cam barrel 301, the first lens group 101, the second group base member 2101 holding the second lens group 201, the third cam barrel 402, and the spring member 702. The follower parts 2101a and the movable follower part 2103a are provided at the image-forming surface side end of the second group base member 2101. The third cam barrel 402 is formed with the cam grooves 402c and 402d for engagement with the follower parts 2101a and the movable follower part 2103a, respectively. In a non-shooting region, the second group base member 2101 is urged by the spring member 702, whereby each of the cam grooves 402c and 402d is brought into contact via one cam surface thereof with an associated one of the follower parts 2101a and the movable follower part 2103a. In a shooting region, each of the cam grooves 402c and 402d is in contact via the two cam surfaces thereof with an associated one of the follower parts 2101a and the movable follower part 2103a. Therefore, the position of the second group base member 2101 in the optical axis direction is restricted.

When the cam followers are disposed on the CCD sensor (image-forming surface) side as described above, it is possible to avoid a situation where the cam grooves to be engaged with the cam followers in the retracted state cannot be formed due to insufficiency of the overall length of the third cam barrel at the first stage. In other words, it is possible to provide the cam followers on the image forming surface side (opposite side from the first lens group), and hence the stroke of the second lens group toward the object side can be increased. Therefore, it is possible to prevent interference between the follower bases 2101c, and the first cam barrel 301 and the rectilinear motion barrel 302 as the second-stage barrels disposed between the first group barrel 102 and the third cam barrel 402, when in the telephoto state. This makes it possible to reduce the spacing between the first lens group 101 and the second lens group 201, and thereby achieve a higher photographing magnification. Further, the cam grooves 402c and 402d are each in contact via one cam surface thereof with the associated cam follower in the non-shooting region, and hence it is possible to reduce the length of the third cam barrel 402 in the optical axis direction.

By causing the follower bases 2101c to overlap the first cam barrel 301 as the second-stage cam barrel in the optical axis direction, it is possible to further reduce the spacing between the first lens group 101 and the second lens group 201.

The cam groove 402d for engagement with the movable cam follower part 2103a and each of the other cam grooves 402c for engagement with the respective follower parts 2101a are formed to be different in cross-sectional shape. This makes it possible to provide the movable cam follower and the other cam followers to thereby achieve stable zoom driving.

Further, it is possible to reliably bring each of the follower parts 2101a and the movable follower part 2103a into contact with the one cam surface of the associated one of the cam grooves 402c and 402d. Therefore, it is possible to provide a non-shooting region (where the zoom lens barrel is in the retracted state) by providing each of the cam grooves 402c and 402d with only one cam surface, which makes it possible to reduce the length of the third cam barrel 402 in the optical axis direction.

Furthermore, since the guide shaft 701e for slidably fitting in the guide hole 2101g of the second group base member 2101 is provided, it is possible to reliably restrict the position of the second group base member 2101 in a direction orthogonal to the optical axis.

Figure 18:
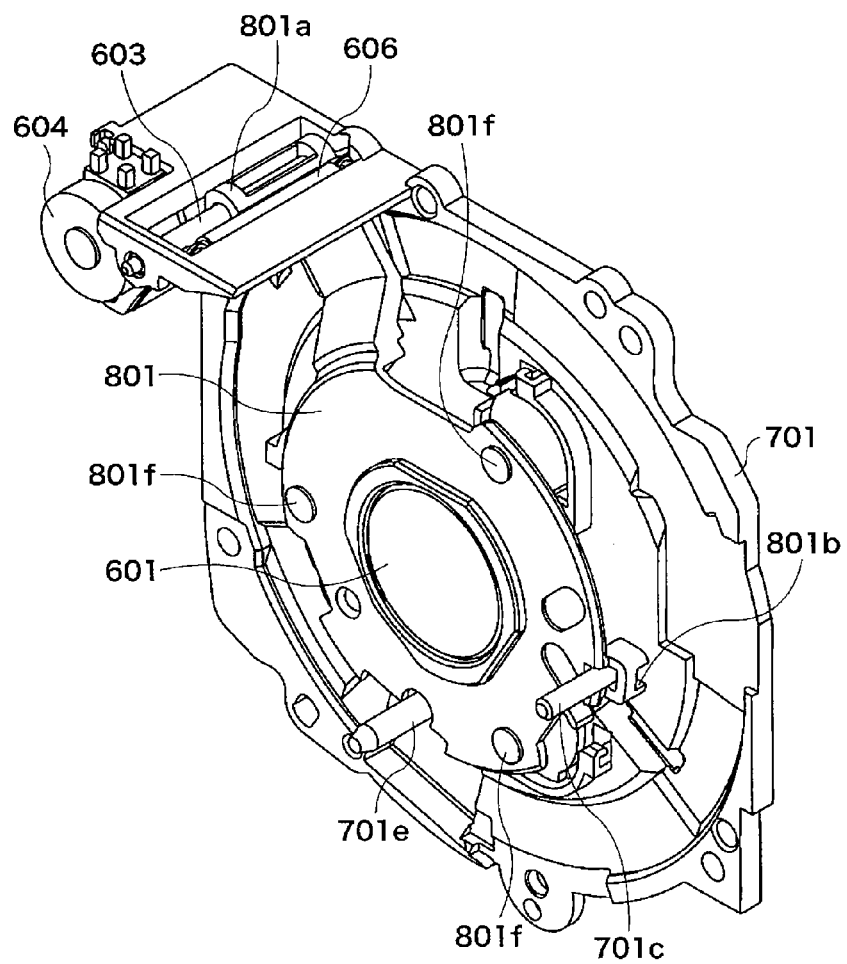
FIG. 18 is a perspective view of essential parts of a zoom lens barrel according to a second embodiment of the present invention.
Figure 19:
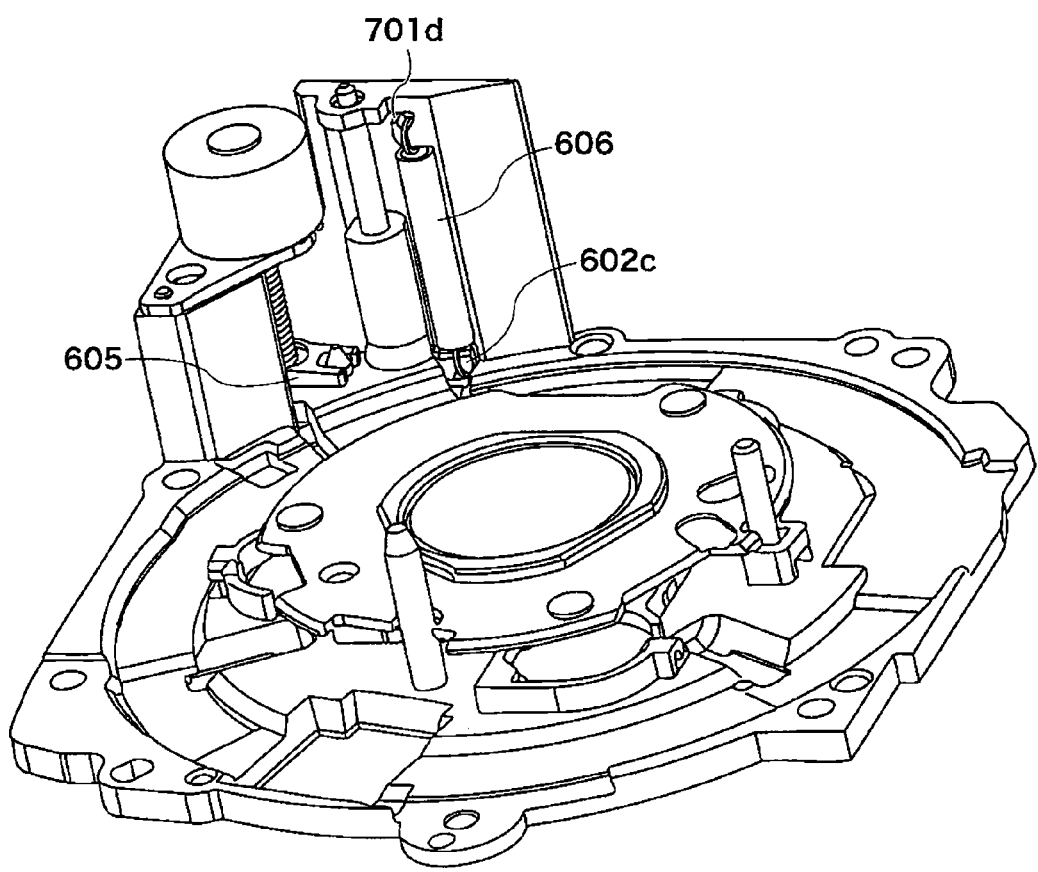
FIG. 19 is a perspective view of the essential parts of the zoom lens barrel, as viewed from a different direction from the view direction in FIG. 18.
Figure 20:
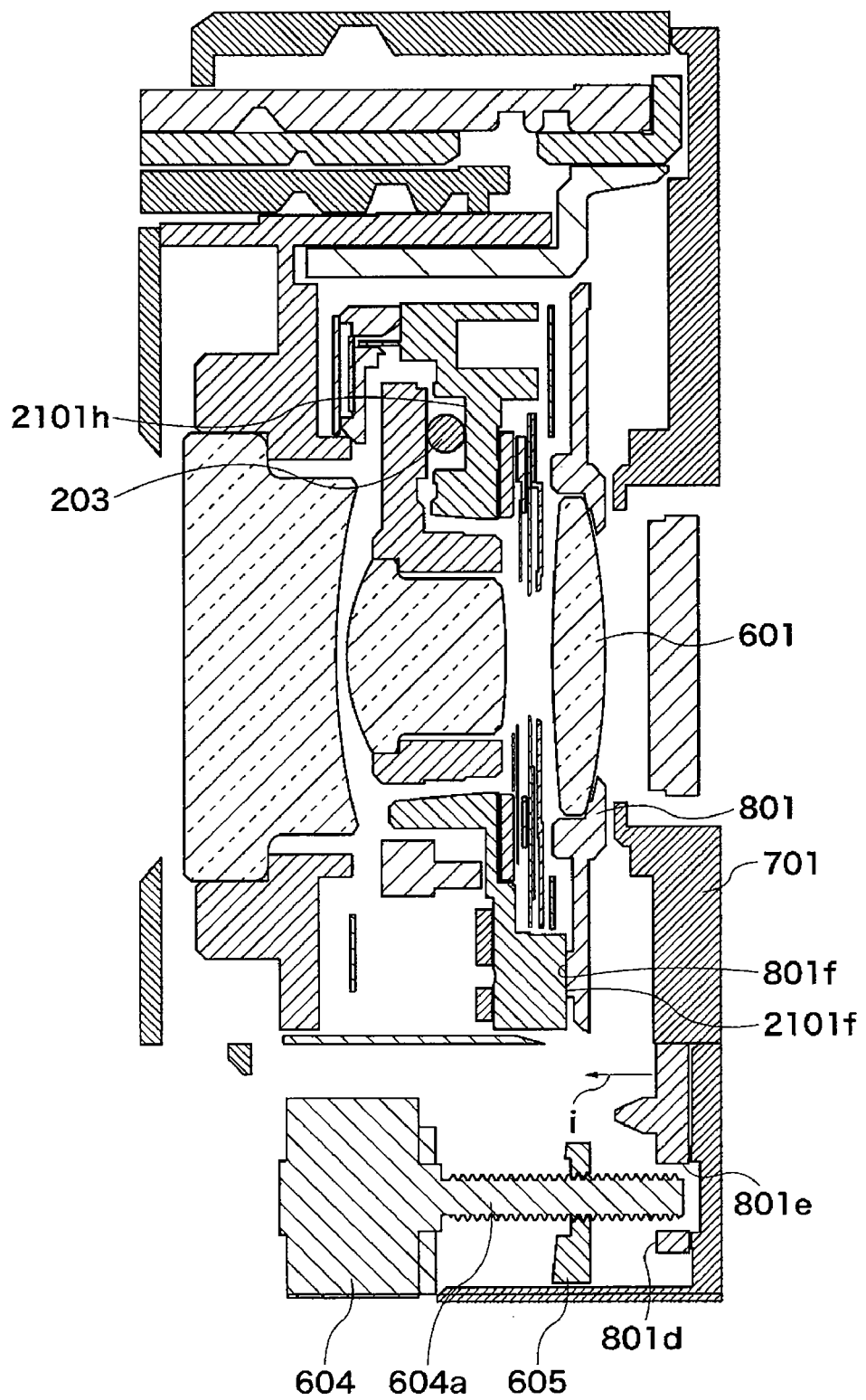
FIG. 20 is a cross-sectional view of the zoom lens barrel in the retracted position.

A description will be given of a zoom lens barrel according to a second embodiment of the present invention. FIG. 18 is a perspective view of essential parts of the zoom lens barrel according to the second embodiment. FIG. 19 is a perspective view of the essential parts of the zoom lens barrel, as viewed from a different direction from the view direction in FIG. 18. FIG. 20 is a cross-sectional view of the zoom lens barrel in the retracted position. It should be noted that component elements corresponding to those in the first embodiment are denoted by identical reference numerals, and description thereof is omitted.

A third lens group-holding member 801 (second holding member) has a main guide portion 801a and a sub guide portion 801b, and holds the third lens group 601 (third lens group). Further, the third lens group-holding member 801 is formed with a spring hook portion, a receiving portion 801d, and a through hole 801e.

Furthermore, the third lens group-holding member 801 has three protrusions 801f formed at respective three circumferential locations, for contact with respective three receiving surfaces 2101f formed on the second group base member 2101 at respective three circumferential locations. The second embodiment is distinguished from the first embodiment only in that the zoom lens barrel of the second embodiment includes the third lens group-holding member 801 formed with the protrusions 801*f*, which is different from the third lens group-holding member 702, and has substantially the same construction as that of the first embodiment, in the other respects which are not described for the second embodiment.

As described hereinbefore in the first embodiment, the nut member 605 is urged toward the screw part 604*a* (i.e. toward an object) by the resilient force of the spring member 606, and the third lens group-holding member 801 is brought into a state urged in an extension direction (direction indicated by an arrow i in FIG. 20).

In the retracted position in FIG. 20, the nut member 605 is at rest in an extended state. The protrusions 801*f* of the third lens group-holding member 801 are in contact with the respective receiving surfaces 2101*f* and are urged by the spring member 606 in the extension direction.

The second group unit 2000 is in a state where each of the follower parts 2101*a* and the movable follower part 2103*a* is in contact with the one cam surface of the associated one of the cam grooves 402*c* and 402*d* (see the ranges C and G in FIG. 9).

At the same time, the stepper motor 604 may be energized to drive the third lens group-holding member 801 such that the protrusions 801*f* are constantly held in contact with the respective receiving surfaces 2101*f* of the second group base member 2101.

As described above, in the zoom lens barrel of the second embodiment, the urging force of the spring member 606 of the third group unit 800 and the driving force of the third lens group-holding member 801 are made use of in place of the resilient force of the spring member 702. This makes it possible to more reliably bring each of the follower parts 2101*a* and the movable follower part 2103*a* into contact with the one cam surface of the associated one of the cam grooves 402*c* and 402*d*.

Therefore, similarly to the first embodiment, it is possible to bring the zoom lens barrel into the retracted state by providing each of the cam grooves 402*c* and 402*d* with only one cam surface, which makes it possible to reduce the length of the third cam barrel 402 in the optical axis direction.

It is to be understood that the present invention is not limited to the above-described preferred embodiments, but it can be practiced in various forms without departing from the spirit and scope thereof.

For example, although in the above-described embodiments, the second hollow cylindrical unit in the present invention is implemented by the third cam barrel 402 which is lower than the first group barrel 102 by two stages, it may be a hollow cylindrical unit which is lower by three or more stages.

Further, although in the above-described embodiments, the zoom lens barrel is fixed to a camera, by way of example, the functions of either of the above-described embodiments can also be accomplished by a zoom lens barrel removable from a camera.

Furthermore, although in the above-described embodiments, the zoom lens barrel is applied to a digital camera, the present invention is applicable to a digital video camera and the like as well.

What is more, although in the above-described embodiments, the zoom lens barrel is applied to a camera, the present invention can be applied to any optical apparatus, such as an optical recording apparatus, an electron microscope, or an electronic telescope, which uses lenses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-184906, filed Aug. 7, 2009, which is hereby incorporated by reference herein in its entirety.

What is claimed is:

1. A zoom lens barrel including a plurality of stages of hollow cylindrical units that are extended in a direction of an optical axis of the zoom lens barrel, comprising:
   a first hollow cylindrical unit configured to hold a first lens group;
   a second hollow cylindrical unit which is lower than said first hollow cylindrical unit by at least two stages;
   a holding member supported by said second hollow cylindrical unit and configured to hold a second lens group; and
   an urging unit configured to urge said holding member toward the first lens group,
   wherein a cam follower is formed on said holding member, and
   a cam portion for engagement with said cam follower is formed on said second hollow cylindrical unit, and
   wherein in a shooting region, said cam portion has two cam surfaces on each of an object side and an image-forming surface side, while having, at a retracted position, one cam surface on the object side,
   wherein at said retracted position, said holding member is urged by said urging unit, whereby said cam portion is brought into contact with said cam follower via the one cam surface on the object side, whereas in a shooting region, said cam portion is in contact with said cam follower via the two cam surfaces on each of the object side and the image-forming surface side, and
   wherein said cam follower in engagement with said cam portion moves in the optical axis direction in accordance with rotation of said second hollow cylindrical unit to thereby move the second lens group toward the first lens group.

2. The zoom lens barrel according to claim 1, wherein a plurality of said cam followers are formed on said holding member at respective circumferential locations about the optical axis of the zoom lens barrel,
   wherein at least one of said cam followers is a movable cam follower configured to be movable by being urged in a direction orthogonal to the optical axis, and
   wherein a plurality of said cam portions with which said cam followers in engagement, respectively, include a cam portion for engagement with said movable cam follower, and said cam portion for engagement with said movable cam follower is different in a shape of cross-section from the others of said cam portions with which the others of said cam followers are in engagement.

3. The zoom lens barrel according to claim 1, further comprising a base member, and
   wherein said urging unit is a spring member provided on said base member, for urging said holding member toward the first lens group.

4. The zoom lens barrel according to claim 1, further comprising a second holding member configured to hold a third lens group, said second holding member having a protrusion formed thereon, and
   wherein said holding member has a receiving surface formed thereon, and
   wherein said urging unit comprises a spring member configured to urge said second holding member toward the first lens group, and a drive unit configured to drive said second holding member in the optical axis direction, and brings the protruding portion formed on said second holding member into contact with the receiving surface of said holding member.

5. The zoom lens barrel according to claim 1, comprising a position restricting unit configured to restrict a position of said holding member in a direction orthogonal to the optical axis in the non-shooting region.

6. The zoom lens barrel according to claim 5, wherein said position restricting unit rectilinearly guides said holding member in the optical axis direction.

7. The zoom lens barrel according to claim 1, wherein a plurality of said cam followers are formed on said holding member at respective circumferential locations about the optical axis of the zoom lens barrel,
wherein at least one of said cam followers is a movable cam follower configured to be movable by being urged in a direction orthogonal to the optical axis.

\* \* \* \* \*